(12) United States Patent
Tamaoki et al.

(10) Patent No.: US 10,744,411 B2
(45) Date of Patent: Aug. 18, 2020

(54) SIMULATION SYSTEM, PROCESSING METHOD, AND INFORMATION STORAGE MEDIUM

(71) Applicant: BANDAI NAMCO ENTERTAINMENT INC., Tokyo (JP)

(72) Inventors: Jun Tamaoki, Tokyo (JP); Haruyoshi Yamamoto, Tokyo (JP); Takashi Aoki, Funabashi (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/279,057

(22) Filed: Feb. 19, 2019

(65) Prior Publication Data
US 2019/0247751 A1    Aug. 15, 2019

Related U.S. Application Data

(63) Continuation of application No. PCT/JP2017/032826, filed on Sep. 12, 2017.

(30) Foreign Application Priority Data

Sep. 14, 2016    (JP) .................................. 2016-179889

(51) Int. Cl.
*A63F 13/5255*    (2014.01)
*G06T 19/00*    (2011.01)
(Continued)

(52) U.S. Cl.
CPC ........ *A63F 13/5255* (2014.09); *A63F 13/211* (2014.09); *A63F 13/25* (2014.09);
(Continued)

(58) Field of Classification Search
CPC .... A63F 13/5255; A63F 13/211; A63F 13/25; A63F 13/26; A63F 13/428; A63F 13/52;
(Continued)

(56) References Cited

U.S. PATENT DOCUMENTS 6,987,512 B2 *  1/2006  Robertson ........... G06F 3/04815
                                                        345/156
7,774,155 B2 *  8/2010  Sato ........................ A63F 13/06
                                                        702/127
(Continued)

FOREIGN PATENT DOCUMENTS

JP    H07-261112 A    10/1995
JP    2010-15360 A    1/2010
(Continued)

OTHER PUBLICATIONS

Nov. 7, 2017 International Search Report issued in International Patent Application No. PCT/JP2017/032827.
(Continued)

*Primary Examiner* — Allen Chan
(74) *Attorney, Agent, or Firm* — Oliff PLC

(57) ABSTRACT

A simulation system includes a processor including hardware. The processor performs: a virtual space setting process of setting a virtual space in which a plurality of objects are arranged; a virtual camera control process of controlling a virtual camera corresponding to a point-of-view of a user wearing a head mounted display; and a display process of generating an image as viewed from the virtual camera in the virtual space as a display image on the head mounted display. In the virtual space setting process, the processor arranges at least one information display object controlled to follow a change in the point-of-view of the user in the virtual space. In the display process, when the information display object and an object in the virtual space have entered into a given positional relationship, the processor performs a change process of a display mode of the information display object or the object.

15 Claims, 20 Drawing Sheets

(51) Int. Cl.

| | |
|---|---|
| *A63F 13/52* | (2014.01) |
| *A63F 13/25* | (2014.01) |
| *A63F 13/525* | (2014.01) |
| *A63F 13/55* | (2014.01) |
| *G06F 3/0481* | (2013.01) |
| *A63F 13/533* | (2014.01) |
| *A63F 13/53* | (2014.01) |
| *A63F 13/577* | (2014.01) |
| *G06F 3/01* | (2006.01) |
| *A63F 13/211* | (2014.01) |
| *A63F 13/26* | (2014.01) |
| *A63F 13/428* | (2014.01) |

(52) U.S. Cl.
CPC ............ *A63F 13/26* (2014.09); *A63F 13/428* (2014.09); *A63F 13/52* (2014.09); *A63F 13/525* (2014.09); *A63F 13/53* (2014.09); *A63F 13/533* (2014.09); *A63F 13/55* (2014.09); *A63F 13/577* (2014.09); *G06F 3/01* (2013.01); *G06F 3/0481* (2013.01); *G06T 19/00* (2013.01); *A63F 2300/8082* (2013.01)

(58) Field of Classification Search
CPC ...... A63F 13/525; A63F 13/53; A63F 13/533; A63F 13/55; A63F 13/577; A63F 2300/8082; G06F 3/01; G06F 3/0481; G06T 19/00
USPC ........................................................ 463/31
See application file for complete search history.

(56) References Cited

U.S. PATENT DOCUMENTS

| | | | |
|---|---|---|---|
| 2008/0132335 A1* | 6/2008 | Yamaguchi | A63F 13/02 463/37 |
| 2012/0062444 A1 | 3/2012 | Cok et al. | |
| 2013/0095924 A1* | 4/2013 | Geisner | G06F 3/012 463/32 |
| 2013/0328927 A1 | 12/2013 | Mount et al. | |
| 2013/0336629 A1 | 12/2013 | Mulholland et al. | |
| 2014/0078175 A1 | 3/2014 | Forutanpour et al. | |
| 2014/0788175 | 3/2014 | Forutanpour et al. | |
| 2014/0364212 A1* | 12/2014 | Osman | A63F 13/213 463/31 |
| 2015/0258432 A1* | 9/2015 | Stafford | A63F 13/213 463/32 |
| 2016/0042566 A1* | 2/2016 | Mao | A63F 13/213 463/32 |
| 2017/0038838 A1 | 2/2017 | Kato et al. | |

FOREIGN PATENT DOCUMENTS

| | | |
|---|---|---|
| JP | 2012-123812 A | 6/2012 |
| JP | 2014-71663 A | 4/2014 |
| JP | 2015-231445 A | 12/2015 |

OTHER PUBLICATIONS

Nov. 7, 2017 International Search Report issued in International Patent Application No. PCT/JP2017/032826.
U.S. Appl. No. 16/279,119, filed Feb. 19, 2019 in the name of Jun Tamaoki et al.
Apr. 20, 2020 Office Action issued in U.S. Appl. No. 16/279,119.

* cited by examiner

FIG. 11A

| INFORMATION DISPLAY OBJECT | TYPE | CHANGE OF DISPLAY MODE |
|---|---|---|
| DSF1 | TPA | ○ |
| DSF2 | TPB | × |
| DSF3 | TPA | ○ |
| ⋮ | ⋮ | ⋮ |

FIG. 11B

| INFORMATION DISPLAY OBJECT | PRIORITY (IMPORTANCE LEVEL) |
|---|---|
| DSG1 | PRA |
| DSG2 | PRB |
| DSG3 | PRC |
| ⋮ | ⋮ | ns
SIMULATION SYSTEM, PROCESSING METHOD, AND INFORMATION STORAGE MEDIUM

CROSS REFERENCE TO RELATED APPLICATION

This application is a continuation of International Patent Application No. PCT/JP2017/032826, having an international filing date of Sep. 12, 2017, which designated the United States, the entirety of which is incorporated herein by reference. Japanese Patent Application No. 2016-179889 filed on Sep. 14, 2016 is also incorporated herein by reference in its entirety.

BACKGROUND

The disclosure relates to a simulation system, a processing method, an information storage medium, and the like.

Systems using head mounted displays (HMDs) have conventionally been known. The system enables a user wearing the HMD on his or her head to experience a virtual reality (VR) world by watching an image displayed on a screen of the HMD. For example, Japanese Patent Application Publication No. 1995-261112 and Japanese Patent Application Publication No. 2012-123812 disclose conventional techniques for such a system using such an HMD.

Japanese Patent Application Publication No. 1995-261112 discloses a method by which, when the user's head enters into a predetermined fluctuation state, the liquid crystal shutter of the HMD is opened to switch visual information provided to the user to surrounding environmental visual information. Japanese Patent Application Publication No. 2012-123812 discloses a method by which the motion of the user's head is identified by a motion detection unit, the process corresponding to the angular speed is executed as the user desires, and the return motion of the user's head is not reflected on the process so that the operation by the motion of the user's head can be performed in an accurate manner.

In the system using an HMD, an image as viewed from a virtual camera in a virtual space is displayed on the HMD. With such an image displayed on the HMD, a vast VR space spreads over the entire field of view of a user, whereby virtual reality for the user can be largely improved.

On the other hand, in the system using an HMD, it is desired to display various kinds of information such as descriptive information and status information to the user.

If such information is not appropriately displayed to the user, various problems will occur. For example, in the system using an HMD, the line-of-sight direction of the user changes in various manners and there exists a large number of objects in the VR space. Therefore, when the display of information to the user is not appropriate, the screen may become hard to see or the virtual reality for the user may be deteriorated.

BRIEF DESCRIPTION OF THE DRAWINGS

FIG. 11A and FIG. 11B are diagrams describing a method for changing the display mode according to the types, priorities, and importance levels of the information display objects.

DESCRIPTION OF EXEMPLARY EMBODIMENTS

Figure 1:
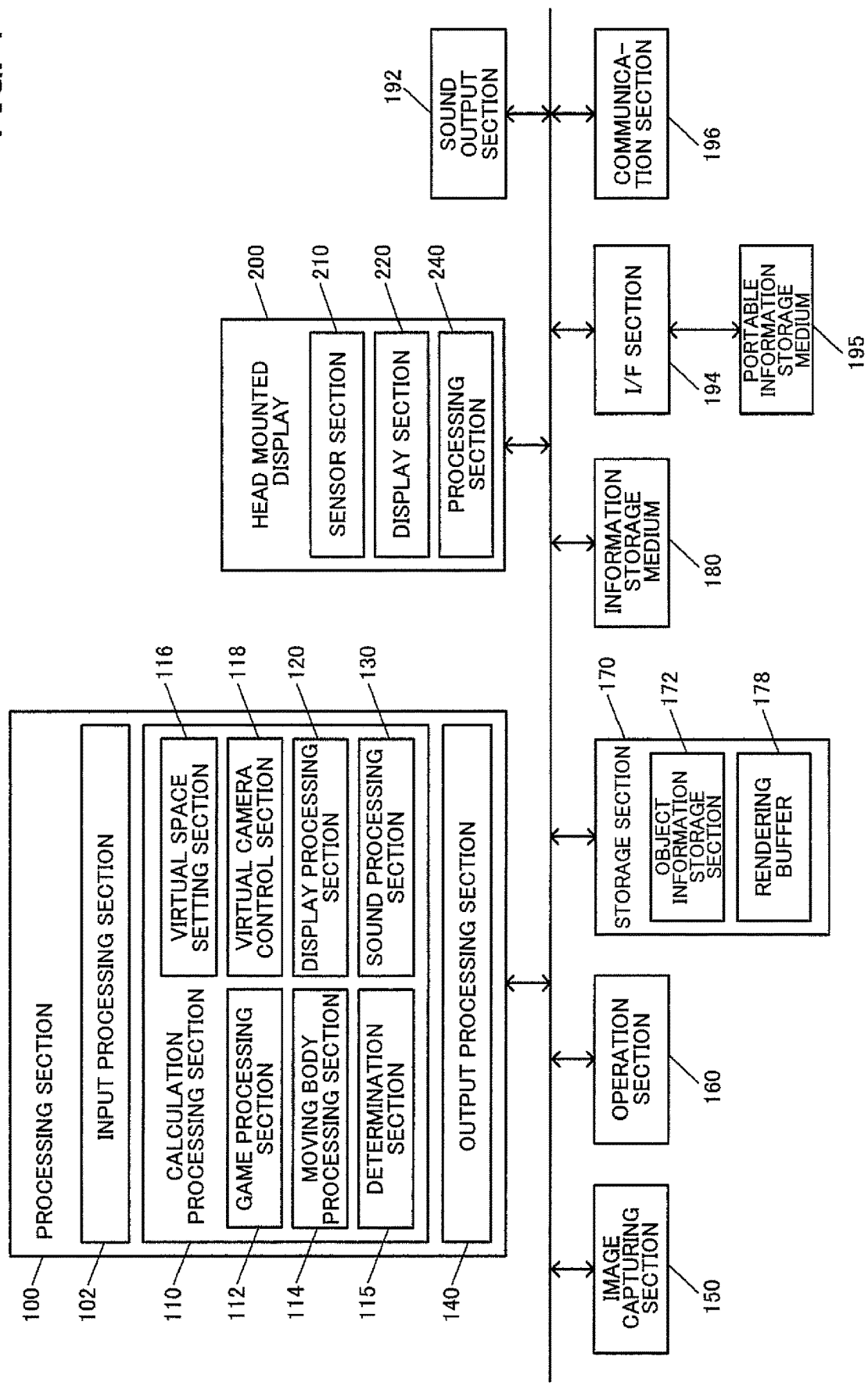
FIG. 1 is a block diagram illustrating a configuration example of a simulation system according to the present embodiment.

The following disclosure provides various different embodiments and examples to embody different features of the presented subject matters. These are apparently provided for illustrative purposes only and are not intended to be construed in a limiting sense. The present disclosure may include repeated use of reference numerals and/or characters in various examples. Such repetitions are provided for a concise and clear description, and do not simply require any relation with various embodiments and/or configurations described. Furthermore, a description of a first element 'connected_ or 'coupled_ to a second element includes some embodiments in which the first element is directly connected or coupled to the second element and other embodiments in which the first element is indirectly connected or coupled to the second element with one or more other elements interposed therebetween.

In accordance with one of some embodiments, it is possible to provide a simulation system that implements an appropriate display process of information display objects in a system using a head mounted display, a process method, and an information storage medium, and the like.

One of some embodiments relates to a simulation system comprising a processor including hardware. The processor performs: a virtual space setting process of settings virtual space in which a plurality of objects are arranged; a virtual camera control process of controlling a virtual camera corresponding to a point-of-view of a user wearing a head mounted display; and a display process of generating an image as viewed from the virtual camera in the virtual space as a display image on the head mounted display. In the virtual space setting process, the processor arranges at least one information display object controlled to follow a change in the point-of-view of the user in the virtual space. In the display process, when the information display object and an object in the virtual space have entered into a given positional relationship, the processor performs a change process of a display mode of the information display object or the object.

In accordance with one of some embodiments, the setting process of the virtual space in which the plurality of objects are arranged is performed and the image as viewed from the virtual camera corresponding to the point-of-view of the user is generated as a display image on the head mounted display. Then, the information display object controlled to follow a change in the point-of-view of the user (a change in at least one of the line-of-sight direction and the point-of-view position) is arranged in the virtual space, and when the information display object and an object in the virtual space have entered into the given positional relationship, the process of changing the display mode of the information display object or the object is performed. Accordingly, when the information display object controlled to follow a change in the point-of-view of the user and the object have entered into the given positional relationship, the display mode of the information display object or the object is changed to prevent display of an inappropriate image on the head mounted display. Therefore, it is possible to provide the simulation system that implements the appropriate display process of the information display object in the system using the head mounted display.

In accordance with one of some embodiments, in the display process, the processor may perform the change process of the display mode according to the type, priority, or importance level of the information display object.

Accordingly, it is possible to implement the appropriate change process of the display mode according to the type, priority, or importance level of the information display object.

In accordance with one of some embodiments, in the display process, the processor may change the display mode of the object among the information display object and the object when the information display object is of a first type, and may change the display mode of the information display object among the information display object and the object when the information display object is of a second type.

Accordingly, it is possible to implement the appropriate display process of the information display object by changing the display mode of one of the information display object and the object according to the type of the information display object.

In accordance with one of some embodiments, in the display process, the processor may perform the change process of the display mode using the priority or the importance level associated with the information display object.

Accordingly, associating the priority or the importance level in advance with the information display object makes it possible to execute the appropriate change process of the display mode using the priority or the importance level.

In accordance with one of some embodiments, in the display process, the processor may perform the change process of the display mode according to the length of a time elapsed from the display of the information display object.

Accordingly, it is possible to implement the change process of the display mode reflecting the length of a time elapsed from the display of the information display object.

In accordance with one of some embodiments, as the change process of the display mode, the processor may perform an erase process of the information display object or the object, a semi-transparentization process of the information display object or the object, a cancel process of following by the information display object to a line-of-sight direction of the user, a movement process of the information display object or the object, a size change process of the information display object or the object, or a color information change process of the information display object or the object.

Accordingly, even when the information display object and the object have entered into the given positional relationship, it is possible to implement the appropriate display process of the information display object by performing the erase process or semi-transparentization process of the information display object or the object, performing the cancel process of following by the information display object, performing the movement process or the size change process of the information display object or the object, or performing the color information change process of the information display object or the object.

In accordance with one of some embodiments, the information display object may be a display object for description display, a display object for status display, a display object for conversation display, a display object for command selection, or a display object for menu display.

Accordingly, it is possible to implement the description display, the status display, the conversation display, the command selection, or the menu display by using the information display object.

In accordance with one of some embodiments, the object may be an object of a moving body, a fixed body, an item, or a background appearing in a game.

Accordingly, it is possible to implement the appropriate display process of the information display object even when the object such as a moving body, a fixed body, an item, or a background appearing in a game and the information display object have entered into the given positional relationship.

In accordance with one of some embodiments, the processor may perform a determination process of determining the positional relationship between the information display object and the object, and in the display process, when it is determined by the determination process that the information display object and the object have entered into the given positional relationship, the processor may perform the change process of the display mode.

Accordingly, it is possible to determine the positional relationship between the information display object and the object by the determination process, and based on the determination result, execute the change process of the display mode of the information display object or the object.

In accordance with one of some embodiments, in the display process, when it is determined by the determination process that the information display object and the object have entered into a positional relationship of collision or a positional relationship of approach, the processor may perform the change process of the display mode.

Accordingly, even when the information display object and the object have entered into the positional relationship of collision or approach which may cause trouble in the display image, it is possible to prevent such trouble by performing the change process of the display mode of the information display object or the object.

In accordance with one of some embodiments, in the determination process, the processor may determine the positional relationship based on three-dimensional coordinate values of the information display object and the object, depth values of the information display object and the object, or two-dimensional coordinate values of the information display object and the object that are projected onto a plane.

Accordingly, it is possible to determine the positional relationship between the information display object and the object by using the three-dimensional coordinate values or depth values of the information display object and the object or the two-dimensional coordinate values of the information display object and the object that are projected onto a plane, and execute the change process of the display mode.

In accordance with one of some embodiments, in the virtual space setting process, the processor may arrange the information display object at a given depth position as seen in the line-of-sight direction of the user in such a manner as to follow a change in the point-of-view of the user.

Accordingly, even when the line-of-sight direction or the point-of-view position of the user changes, it is possible to arrange and display the information display object at the given depth position as seen in the line-of-sight direction of the user in such a manner as to follow the change. Therefore, it is possible to prevent a situation in which the virtual reality for the user is deteriorated or the display image is hard to see.

In accordance with one of some embodiments, in the virtual camera control process, the processor may control the virtual camera to follow a change in the point-of-view of the user based on tracking information of point-of-view information of the user.

Accordingly, it is possible to display the image as viewed from the virtual camera on the head mounted display while changing the line-of-sight direction and the point-of-view position of the virtual camera in the virtual space following a change in the point-of-view of the user in the real world, for example.

In accordance with one of some embodiments, the processor may perform a game process, and in the game process, the processor may perform a process of activating an effect of a command according to information of a character as a target of gameplay by the user and the point-of-view information of the user.

Accordingly, it is possible to implement the process of activating the effect of the command reflecting the relationship between the character and the user to realize an unprecedented type of game.

One of some embodiments relates to a processing method. The method includes: a virtual space setting process of setting a virtual space in which a plurality of objects are arranged; a virtual camera control process of controlling a virtual camera corresponding to a point-of-view of a user wearing a head mounted display; and a display process of generating an image as viewed from the virtual camera in the virtual space as a display image on the head mounted display. In the virtual space setting process, at least one information display object controlled to follow a change in the point-of-view of the user is arranged in the virtual space. In the display process, when the information display object and an object in the virtual space have entered into a given positional relationship, a change process of a display mode of the information display object or the object is performed.

Exemplary embodiments are described below. Note that the following exemplary embodiments do not in any way limit the scope of the content defined by the claims laid out herein. Note also that all of the elements described in the present embodiment should not necessarily be taken as essential elements.

1. Simulation System

FIG. 1 is a block diagram illustrating a configuration example of a simulation system (a simulator, a game system) according to the present embodiment. The simulation system according to the present embodiment is a system that simulates Virtual Reality (VR) for example, and can be applied to various systems such as a game system providing game contents, a real-time simulation system including a sports event simulator and a driving simulator, a content providing system that provides a content such as a movie, or an operating system for implementing a remote controlled operation. The simulation system according to the present embodiment is not limited to the configuration illustrated in FIG. 1, and can be modified in various ways including omitting some of its components (sections) or adding another component.

An image capturing section 150 includes one or more cameras. Each of the cameras is formed from an optical system including a lens (a wide-angle lens) and imaging elements such as a CCD and a CMOS sensor. The image capturing section 150 may be provided with one or more microphones. Using the image capturing section 150 makes it possible to detect information on a user's motion (motion information on individual body parts and skeleton information) and implement user recognition processing (face recognition and the like). In addition, providing the image capturing section 150 with a plurality of cameras makes it possible to recognize the depth direction in a space and determine the front-back positional relationship between two users playing in front of the image capturing section 150. Further, providing the image capturing section 150 with a plurality of microphones makes it possible to detect the direction of a sound source and the like. For example, using the image capturing section 150 with a plurality of cameras and a plurality of microphones makes it possible to implement a game that can be intuitively played using the user's motion and voice as operation information.

An operation section 160 is used by a user (player) to input various types of operation information (input information). The operation section 160 can be implemented by various operation devices such as an operation button, a direction designating key, a joystick, a handle, a pedal, and a lever for example.

A storage section 170 stores therein various types of information. The storage section 170 functions as a work area for a processing section 100, a communication section 196, and the like. The storage section 170 stores therein a game program and game data required for executing the game program. The function of the storage section 170 can be implemented by a semiconductor memory (dynamic random access memory (DRAM), video RAM (VRAM)), a hard disk drive (HDD), a solid state drive (SSD), an optical disc device, or the like. The storage section 170 includes an object information storage section 172 and a rendering buffer 178.

An information storage medium 180 (computer-readable medium) stores therein a program, data, and the like. The function of the information storage medium 180 can be implemented by an optical disc (a digital versatile disc (DVD), a Blu-ray disc (BD), a compact disc (CD)), an HDD, a semiconductor memory (read only memory (ROM)), and the like. The processing section 100 performs various processes according to the present embodiment based on a program (data) stored in the information storage medium 180. Thus, the information storage medium 180 stores therein a program for causing a computer (a device including an input device, the processing section, the storage section, and an output section) to function as the sections according to the present embodiment (a program for causing a computer to perform processes of the sections).

A head mounted display (HMD) 200 is a device that is worn on the head of the user, and displays an image in front of the eyes of the user. The HMD 200 is preferably a non-transparent type, but may also be a transparent type. The HMD 200 may be what can be referred to as an eye-piece type HMD.

The HMD 200 includes a sensor section 210, a display section 220, and a processing section 240. The sensor section 210 implements a tracking process such as head tracking for example. For example, the position and the direction of the HMD 200 are identified through the tracking process performed with the sensor section 210. With the position and the direction of the HMD 200 thus identified, a point-of-view position and a line-of-sight direction of the user as point-of-view information can be identified.

Various tracking schemes can be employed. For a first tracking scheme as an example of the tracking scheme, a plurality of light emitting elements (LEDs) are provided as the sensor section 210, as will be described in detail later with reference to FIG. 2A and FIG. 2B. The light from the plurality of light emitting elements is imaged by the image capturing section 150 to identify the position and the direction of the HMD 200 (the head of the user) in a three-dimensional space of the real world. For a second tracking scheme, a plurality of light receiving elements (such as photodiodes) are provided as the sensor section 210, as will be described in detail later with reference to FIG. 3A and FIG. 3B. With the plurality of light receiving elements receiving light (such as a laser beam) from a light emitting element (such as LEDs) provided outside, the position and the direction of the HMD 200 are identified. A third tracking scheme uses a motion sensor, provided to the sensor section 210, to identify the position and the direction of the HMD 200. For example, the motion sensor can be implemented with an acceleration sensor, a gyro sensor, or the like. For example, the position and the direction of the HMD 200 in the three-dimensional space in the real world can be identified with a 6-axis motion sensor including a 3-axis acceleration sensor and a 3-axis gyro sensor. The position and the direction of the HMD 200 may be identified with a combination of the first tracking scheme and the second tracking scheme, or a combination of the first tracking scheme and the third tracking scheme. A tracking process of directly identifying the point-of-view position and line-of-sight direction of the user, instead of identifying the position and the direction of the HMD 200 to identify the point-of-view position and line-of-sight direction of the user, may be employed.

For example, the display section 220 of the HMD 200 can be implemented with an organic electroluminescence display (OEL), a liquid crystal display (LCD), or the like. For example, the display section 220 of the HMD 200 is provided with a first display or a first display area set to be in front of the left eye of the user, and a second display or a second display area set to be in front of the right eye of the user, whereby stereoscopic view can be provided. The stereoscopic view is implemented with left-eye and right-eye images, with parallax, generated to be respectively displayed on the first and the second displays. Alternatively, the left-eye image and the right-eye image are respectively displayed on the first and the second display areas of a single display. The HMD 200 is provided with two eyepieces (fish-eye lenses) for the left-eye and the right-eye so that a VR space can be provided entirely over the field of view of the user. A correction process is performed for the left-eye image and the right-eye image to correct distortion produced in an optical system such as the eyepiece. This correction process is performed by the display processing section 120.

The processing section 240 of the HMD 200 performs various processes required in the HMD 200. For example, the processing section 240 performs a control process for the sensor section 210, a display control process for the display section 220, or the like. The processing section 240 may perform a three-dimensional acoustic (stereophonic sound) process to simulate direction, distance and spreading of sound in three dimensions.

A sound output section 192 outputs sound generated in accordance with the present embodiment, and can be implemented by a speaker, a headphone, or the like.

An interface (I/F) section 194 performs an interface process for a portable information storage medium 195. The function of the I/F section 194 can be implemented with an application specific integrated circuit (ASIC) for the I/F process. The portable information storage medium 195 is a storage device that stores therein various types of information from the user, and holds the information without power supply. The portable information storage medium 195 can be implemented with an integrated circuit (IC) card (memory card), a universal serial bus (USB) memory, a magnetic card, or the like.

The communication section 196 communicates with external apparatuses (other devices) through a wired or wireless network. The function of the communication section 196 can be implemented with a communication ASIC, hardware such as a communication processor, or a communication firmware.

The program (data) for causing a computer to function as the sections according to the present embodiment may be distributed to the information storage medium 180 (or the storage section 170) from an information storage medium of a server (host device) through a network and the communication section 196. The scope of the present disclosure can include such a configuration where the information storage medium of the server (host device) is used.

The processing section 100 (processor) performs a game process (simulation process), a moving body process, a virtual camera control process, a display process, or sound process based on operation information from the operation section 160, tracking information about the HMD 200 (information about at least one of the position and direction of the HMD, information about at least one of the point-of-view position and the line-of-sight direction), a program, and the like.

Processes (functions) according to the present embodiment performed by sections of the processing section 100 can be implemented by a processor (processor including hardware). For example, the processes according to the present embodiment can be implemented by a processor that operates based on information such as a program and a memory that stores therein the information such as the program. For example, the processor may implement the functions of the sections in discrete hardware or in integrated hardware. For example, the processor may include hardware, and the hardware may include at least one of a circuit that processes a digital signal and a circuit that processes an analog signal. For example, the processor may include one or a plurality of circuit devices (such as an integrated circuit (IC) for example) or one or a plurality of circuit elements (such as a resistor and a capacitor for example) mounted on a circuit board. For example, the processor may be a central processing unit (CPU). However, the processor is not limited to the CPU, and various processors such as a graphics processing unit (GPU) or a digital signal processor (DSP) may be used. The processor may be a hardware circuit such as an ASIC. The processor may include an amplifier circuit, a filter circuit, or the like that processes an analog signal. The memory (storage section 170) may be a semiconductor memory such as a static random access memory (SRAM) and a DRAM or may be a resistor. Furthermore, the memory may be a magnetic storage device such as a hard disk device (HDD) or may be an optical storage device such as an optical disc device. For example, the memory stores therein a computer-readable command, and the processes (functions) of the sections of the processing section 100 are implemented with the processor executing the command. This command may be a set of commands forming a program, or may be a command for instructing an operation to a hardware circuit of the processor.

The processing section 100 includes an input processing section 102, a calculation processing section 110, and an output processing section 140. The calculation processing section 110 includes a game processing section 112, a moving body processing section 114, a determination section 115, a virtual space setting section 116, a virtual camera control section 118, a display processing section 120, and a sound processing section 130. As described above, the processes according to the present embodiment performed by these sections may be implemented by a processor (or a processor and a memory). Various modifications may be made with some of these components (sections) omitted, or another component added.

The input processing section 102 performs an input process including: a process of receiving operation information or tracking information; a process of reading information from the storage section 170; and a process of receiving information through the communication section 196. For example, the input processing section 102 performs an input process including: a process of acquiring operation information input by a user by using the operation section 160 and tracking information detected by the sensor section 210 of the HMD 200; a process of reading information, designated with a read command, from the storage section 170; and a process of receiving information from an external apparatus (such as a server) through a network. The receiving process includes a process of instructing the communication section 196 to receive information, acquiring the information received by the communication section 196, and writing the information to the storage section 170.

The calculation processing section 110 performs various calculation processes. For example, the calculation processes are performed for a game process (simulation process), a moving body process, a virtual camera control process, a display process, a sound process, or the like.

The game processing section 112 (a program module for a game process) performs various game processes for the user to play the game. In other words, the game processing section 112 (simulation processing section) performs various simulation processes to enable the user to experience virtual reality. Examples of the game process include a process of starting the game when a game start condition is satisfied, a process of making the started game progress, a process of ending the game when a game end condition is satisfied, and a process of calculating a game result.

The moving body processing section 114 (a program module for a moving body process) performs various processes for a moving body that moves in a virtual space. For example, a process of moving the moving body in a virtual space (object space or game space) or a process of causing the moving body to make an action is performed. For example, the moving body processing section 114 performs a control process based on the operation information input by the user using the operation seed on 160, tracking information acquired, a program (movement/operation algorithm), and various types of data (motion data), and the like. The control process includes moving the moving body (model object) in the virtual space and causing the moving body to make an action (motion, animation). Specifically, a simulation process is performed to sequentially obtain movement information (position, rotational angle, speed, or acceleration) and action information (a position and a rotational angle of a part object) of the moving body on a frame (for example, 1/60 seconds) by frame basis. The frame is a unit of time for performing a movement/action process (simulation process) of the moving body and an image generation process. For example, the moving body is a virtual user (virtual player) in a virtual space corresponding to the user (player) in the real space, a ridden moving body (operated moving body) ridden (operated) by the virtual user, or a character as a target of play by the virtual user.

The determination section 115 (a program module for determination processes) performs various determination processes. The determination section 115 will be described later in detail.

The virtual space setting section 116 (a program module for a virtual space setting process) performs a setting process for a virtual space (object space) where a plurality of objects is arranged. For example, a process of setting an arrangement of various objects (an object formed by a primitive surface such as a polygon, a free-form surface or a subdivision surface) representing various display objects such as a moving body (such as a person, a robot, a car, a train, an aircraft, a boat, a monster, or an animal), a map (terrain), a building, audience seats, a course (road), woods, a wall, and a water surface in the virtual space is performed. Specifically, a position and a rotational angle (that is the same as an orientation or a direction) of an object in a world coordinate system are determined, and the object is arranged at the position (X, Y, Z) at the rotational angle (rotational angles about X, Y, and Z axes). Thus, the object information storage section 172 of the storage section 170 stores object information in association with an object number. The object information includes information about a position, rotational angle, a movement speed, a moving direction, and the like of an object (part object) in the virtual space. Examples of the process performed by the virtual space setting section 116 include updating the object information on a frame by frame basis.

The virtual camera control section 118 (a program module for a virtual camera control process) performs a control process for a virtual camera (point-of-view, reference virtual camera) to generate an image as viewed from a given (any) point-of-view in the virtual space. For example, a process of controlling a point-of-view position or a line-of-sight direction (position or orientation) of the virtual camera is performed. Specifically, a process (a process of controlling a point-of-view position, a line-of-sight direction, or an angle of view) of controlling the position (X, Y, Z) of the virtual camera and a rotational angle (a rotational angle about an X, Y, or Z axis) as orientation information is performed. The virtual camera corresponds to a point-of-view of the user (virtual user). When stereoscopic view is implemented, a left-eye first point-of-view (left-eye first virtual camera) and a right-eye second point-of-view (right-eye second virtual camera) are set.

The display processing section 120 (a program module for a display process) performs a display process for a game image (simulation image). For example, a rendering process is performed based on results of various processes (a game process, a simulation process) performed by the processing section 100 to generate an image, and the image is displayed on the display section 220 of the HMD 200. Specifically, a geometry process such as coordinate transformation (world coordinate transformation, camera coordinate transformation), a clipping process, a perspective transformation, or a light source process is performed. Rendering data (coordinates of the vertex position of the primitive surface, texture coordinates, color data, a normal vector, an value, or the like) is generated based on a result of the process. An object (one or a plurality of primitive surfaces) after the perspective transformation (after the geometry process) is rendered in the rendering buffer 178 (a frame buffer, a work buffer or the like that can store image information in a unit of pixels), based on the rendering data (primitive surface data). Thus, an image as viewed from the virtual camera (a given point-of-view, a left-eye, right-eye, first, or second point-of-view) is generated in the virtual space. The rendering process performed by the display processing section 120 can be implemented with a vertex shader process, a pixel shader process, or the like.

The sound processing section 130 (a program module for sound process) performs a sound process based on a result of various processes performed by the processing section 100. Specifically, game sound such as a song (music, background music (BGM)), a sound effect, or a voice is generated to be output by the sound output section 192. A part (three-dimensional acoustic process for example) of the sound process performed by the sound processing section 130 may be implemented by the processing section 240 of the HMD 200.

The output processing section 140 performs an output process of outputting various types of information. For example, the output processing section 140 performs the output process including: a process of writing information to the storage section 170; and a process of transmitting information through the communication section 196. For example, the output processing section 140 performs a process of writing information, designated by a write command, to the storage section 170, and a process of transmitting information to an external apparatus (such as a server) through a network. This transmission process is a process of instructing the communication section 196 to transmit information, and a process of designating the information to be transmitted to the communication section 196.

The simulation system of the present embodiment includes the virtual space setting section 116, the virtual camera control section 118, and the display processing section 120 as illustrated in FIG. 1. The virtual space setting section 116 performs a setting process of a virtual space in which a plurality of objects is arranged. For example, the virtual space setting section 116 performs a process of setting the positions and directions of a plurality of objects and arranging the same in a virtual space. The objects are display objects that are game elements appearing in a game or constituting a game space.

The virtual camera control section 118 performs a control process of the virtual camera corresponding to the point-of-view of the user wearing the HMD 200. For example, the virtual camera control section 118 controls the virtual camera set as a first person point-of-view of the user. For example, the virtual camera is set to be at a position corresponding to the point-of-view of the virtual user moving in the virtual space, and the point-of-view position and the line-of-sight direction of the virtual camera are set to control the position (position coordinates) and the orientation (a rotational angle about a rotation axis) of the virtual camera.

The display processing section 120 generates an image as viewed from the virtual camera (user point-of-view) in the virtual space as a display image (display video) of the HMD 200. For example, an image as viewed from a given point-of-view in the object space as the virtual space is generated. The generated image is a stereoscopic image, for example.

In the present embodiment, the virtual space setting section 116 arranges at least one information display object in the line-of-sight direction of the user (a field of view range of the user). Specifically, the virtual space setting section 116 arranges at least one information display object controlled to follow a change in the point-of-view of the user (a change in the point-of-view of the virtual camera) in the virtual space. The change in the point-of-view here refers to a change in at least one of the line-of-sight direction and the point-of-view position, for example. That is, the virtual space setting section 116 arranges the information display object controlled to follow at least one of the line-of-sight direction and the point-of-view position of the user. For example, when the line-of-sight direction or the point-of-view position of the user changes, the arrangement position (three-dimensional position) of the information display object in the virtual space also changes accordingly. For example, when the line-of-sight direction of the user changes leftward, rightward, upward, or downward, the position and direction of the information display object in the virtual space also change to follow the change in that direction. Otherwise, when the point-of-view position of the user (user position) moves leftward, rightward, upward, or downward, the position and others of the information display object in the virtual space also change to follow that movement (position change). For example, when the information display object is formed from a billboard polygon, the billboard polygon constituting the information display object is arranged to face the point-of-view of the user (orthogonal to the line-of-sight direction of the user).

When the information display object and an object (one of the plurality of objects) in the virtual space have entered into a given positional relationship, the display processing section 120 performs a change process of a display mode (display method or display scheme) of the information display object or the object. For example, when the information display object and an object have entered into that positional relationship, the display processing section 120 generates a display image of the HMD 200 in such a manner as to be seen differently from an image in which the information display object and the object are in that positional relationship. That is, as described above, when the line-of-sight direction or the point-of-view position of the user changes, the information display object changes in position or direction to follow that change in the virtual space. Therefore, the positional relationship between the information display object and each of the plurality of objects in the virtual space changes in various manners. When the positional relationship between the information display object and an object have entered into a predetermined positional relationship (positional relationship of collision or approach), the display mode (display image) of the information display object or the object is changed. The display processing section 120 may perform the change process of the display modes of both the information display object and the object.

In this case, the display processing section 120 may perform the change process of the display mode according to the type, priority, or importance level of the information display object. For example, the display processing section 120 performs the change process of the display mode of the information display object or the object reflecting the type, priority, or importance level of the information display object. The type of the information display object is determined by the type of information provided by the information display object or the like, for example. For example, the storage section 170 stores information on the type in association with each information display object, and the information on the type is used to perform the change process of the display mode. The priority and importance level of the information display object are information indicating how high the information provided by the information display object is in priority and importance level. For example, the storage section 170 stores information on the priority and importance level in association with each information display object, and the information on the priority and importance level is used to perform the change process of the display mode.

For example, when the information display object is of a first type, the display processing section 120 changes the display mode of the object. For example, when the information display object is of the first type (for example, the information display object for command selection), the display processing section 120 changes the display mode of the object (erasing or semi-transparentization) without changing the display mode of the information display object. In contrast to this, when the information display object is of a second type (for example, the information display object for description display), the display processing section 120 charges the display mode of the information display object. For example, when the information display object is of the second type, the display processing section 120 changes the display mode of the information display object (erasing or semi-transparentization) without changing the display mode of the object. Whether the information display object is of the first type or of the second type is stored in the storage section 170 in association with the information display object.

The display processing section 120 also performs the change process of the display mode using the priority or the importance level in association with the information display object. For example, the storage section 170 stores the information on the priority and the importance level in association with the information display object. In the case of performing the change process of the display mode, the display processing section 120 reads the information on the priority and the importance level associated with the information display object to be processed from the storage section 170 and performs the change process of the display mode of the information display object or the object (as a target of determination on positional relationship).

The display processing section 120 also performs the change process of the display mode according to the length of a time elapsed from the display of the information display object. For example, the display processing section 120 measures and records the length of a time elapsed from the display of each information display object. Then, in the case of performing the change process of the display mode of the information display object or the object the display processing section 120 performs the process reflecting the elapsed time. For example, the display processing section 120 performs the change process of the display mode of the information display object with a longer time elapsed from the display in priority to the information display object with a shorter time elapsed from the display.

The display processing section 120 also performs, as the change process of the display mode, an erase process of the information display object or the object, a semi-transparentization process of the information display object or the object, a cancel process of following by the information display object to the line-of-sight direction of the user, a movement process of the information display object or the object, a size change process of the information display object or the object, a color information change process of the information display object or the object, and the like.

The erase process of the information display object or the object can be implemented by excluding the information display object or the object from display targets (display list) or semi-transparentizing the information display object or the object. The semi-transparentization process of the information display object or the object can be implemented by changing the semi-transparency (value) of the information display object or the object such that the information display object or the object becomes more semi-transparent, for example. Although the information display object is controlled to follow a change in the line-of-sight direction of the user as described above, cancelling (reducing) this follow control makes it possible to implement the cancel process of following by the information display object to the line-of-sight direction of the user. The movement process and size change process of the information display object or the object can be implemented by moving the information display object or the object or changing the size of the information display object or the object such that the information display object and the object do not enter into the positional relationship of collision or approach, for example. The color information change process of the information display object or the object can be implemented by changing the brightness, chroma, or hue of the information display object or the object, for example. For example, the color information change process of the information display object or the object may be performed by bringing the color information of the information display object or the object closer to the color information of the background, for example, such that the information display object or the object blends into the background. This process can be implemented by blending or depth queuing based on the color information of the information display object or the object and the color information of the background, for example.

The information display object is a display object for description display, a display object for status display, a display object for conversation display, a display object for command selection, or a display object for menu display, for example. The display object for description display is a display object for providing the user with various descriptions on a game or the like, for example. The display object for status display is a display object for informing the user about various situations in a game or the like, for example. The display object for conversation display is a display object for informing the user about the contents of various conversations, for example. For example, the display object for conversation display is a display object for informing the contents of the conversations of a character as a target of play by the user. The display object for command selection is a display object used by the user to select a command in a game or the like, for example. For example, the display object for command selection is a display object for presenting command options to the user, for example. The display object for menu display is a display object for presenting a menu screen in a game or the like to the user. For example, the display object for menu display is a display object for presenting a menu screen for game mode, game setting (option setting), or game end instruction to the user. The information display object is a display object for providing the user with information by using characters, icons, or graphics, for example. As an example, the information display object can be implemented by a billboard polygon in which information for the user is rendered.

On the other hand, the object (a target of determination on the positional relationship with the information display object) is an object of a moving body, a fixed body, an item, or a background appearing in a game, for example. The moving body appearing in a game is a character as a target of play by the user or a display object moving in various directions and to various positions in a game, for example. The fixed body is a display object that does not move like a moving body but is fixed at a predetermined position in the virtual space. The item is a display object such as various kinds of tools appearing in a game, which is a display object to be played, held, or gripped by the user. The object of the background is an object constituting the background of a game or the like. For example, the object is any of a plurality of objects arranged in the virtual space other than the information display object and can be a target of determination on the positional relationship with the information display object.

The simulation system also includes the determination section 115 that determines the positional relationship between the information display object and the object. For example, the determination section 115 determines whether the information display object and the object have entered into a given positional relationship (positional relationship of collision or approach). When the determination section 115 determines that the information display object and the object have entered into the given positional relationship, the display processing section 120 performs the change process of the display mode of the information display object or the object.

Specifically, when the determination section 115 determines that the information display object and the object have entered into the positional relationship of collision or approach (proximity), the display processing section 120 performs the change process of the display mode. For example, whether the information display object and the object has entered into the positional relationship of approach can be determined by judging whether the distance between the information display object and the object (the distance in the three-dimensional coordinates or the distance in the depth direction) becomes equal to or less than a predetermined distance. Whether the information display object and the object have entered into the positional relationship of collision can be determined by performing a publicly known collision process on the information display object and the object. For example, the determination can be made by performing hit determination (crossing determination) on the information display object and the object.

The determination section 115 can determine the positional relationship based on three-dimensional coordinate values of the information display object and the object, depth values of the information display object and the object, or two-dimensional coordinate values of the information display object and the object that are projected onto a plane. For example, the determination section 115 determines whether the information display object and the object have entered into the positional relationship of collision or approach based on the three-dimensional coordinate values and size information (shape information) of the information display object and the object. Otherwise, the determination section 115 determines whether the information display object and the object have entered into the given positional relationship by comparing the depth value (Z value) of the information display object with the depth value (Z value) of the object. Otherwise, the determination section 115 determines whether the information display object and the object have entered into the positional relationship of collision or approach by projecting the information display object and the object onto a plane (screen) and using the two-dimensional coordinate values (two-dimensional shapes) of the information display object and the object on the plane (projection image). For example, the determination section 115 can determine whether the information display object and the object has entered into the positional relationship of collision or approach by judging the overlap and distance between the information display object and the object on the plane.

The virtual space setting section 116 arranges the information display object at a given depth position in the line-of-sight direction of the user in such a manner as to follow a change in the point-of-view of the user (a change in at least one of the line-of-sight direction and the point-of-view position). For example, the virtual space setting section 116 arranges the information display object to follow a change in the point-of-view (a change in the line-of-sight direction or the point-of-view position) such that there is no change in the depth position (depth distance) of the information display object to the point-of-view of the user (virtual camera). For example, the virtual space setting section 116 arranges the information display object formed from a billboard polygon, for example, at a given depth position (the position in a Z coordinate axis) from the point-of-view of the user (virtual camera).

The virtual camera control section 118 controls the virtual camera to follow a change in the point-of-view of the user based on tracking information of the point-of-view information of the user.

For example, the input processing section 102 (input reception section) acquires tracking information of point-of-view information of the user wearing the HMD 200. For example, the input processing section 102 acquires tracking information (point-of-view tracking information) for pointof-view information that is at least one of the point-of-view position and the line-of-sight direction of the user. For example, the tracking information can be acquired by performing a tracking process for the HMD 200. The point-of-view position and the line-of-sight direction of the user may be directly acquired by the tracking process. For example, the tracking information may include at least one of change information (a value of change in the coordinates of the point-of-view position) about the point-of-view position from the initial point-of-view position of the user and change information (a value of change in the rotational angle about the rotation axis of the line-of-sight direction) of the line-of-sight direction from the initial line-of-sight direction of the user. Based on the change information about the point-of-view information included in such tracking information, the point-of-view position and/or the line-of-sight direction of the user (the information about the position and the orientation of the head of the user) can be identified.

The virtual camera control section 118 changes the point-of-view position and/or the line-of-sight direction of the virtual camera based on the acquired tracking information (information about at least one of the point-of-view position and the line-of-sight direction of the user). For example, the virtual camera control section 118 sets the virtual camera so that the point-of-view position/line-of-sight direction (position/orientation) of the virtual camera in the virtual space changes in accordance with the change in the point-of-view position/line-of-sight direction of the user in the real space. Thus, the virtual camera can be control led to follow the change in the point-of-view of the user, based on the tracking information about the point-of-view information of the user.

In the present embodiment, a virtual reality simulation process is performed as a game process for the game played by the user. The virtual reality simulation process is a simulation process simulating a real space event in the virtual space, and is for enabling the user to virtually experience the event. For example, a process of moving the moving body such as a virtual user corresponding to the user in the real space or its ridden moving body in the virtual space is performed for enabling the user to experience a change in an environment or surroundings due to the movement.

The simulation system includes the game processing section 112 that performs game processes. The game processing section 112 performs a process of activating an effect of a command corresponding to the information on a character as a target of gameplay by the user and the point-of-view information of the user.

In the present embodiment, for example, the game processing section 112 performs a process of accepting a command selected by the user from a plurality of commands. For example, the storage section 170 (command information storage section) stores information on N commands that can be selected by the user. For example, M (M<N) commands are selected automatically or by the user from the N commands, and a command set called deck is organized. During gameplay, the user selects a desired command from the M commands. Accordingly, the selected command is accepted as a command of activation target.

The game processing section 112 performs the process of activating the effect of the accepted command as a game process. For example, the effect of each command is associated with the command and is stored as command information in the storage section 170. The game processing section 112 performs the process of activating the effect associated with the command selected by the user.

Based on the result of activation of the effect of the command, the game processing section 112 performs a game process such as a process of calculating game parameters, a process of proceeding the game, a process of calculating game performance (game result), or a process of controlling an icon corresponding to the command.

Specifically, the game processing section 112 performs the calculation process of increasing or decreasing the values of the game parameters. Based on the game parameters after the calculation process, the game processing section 112 performs various game processes such as controlling the action (behavior) of a character, branching the story, and generating a game event. For example, the game processing section 112 performs a game process such that the story is made progress by the user and the character as a target of gameplay by the user.

Based on the result of the game process described above, the display processing section 120 performs a display process of game images. For example, the display processing section 120 performs the process of displaying game images on the display section 220 of the HMD 200 according to the results of the calculation of the game parameters, the results of the game progress process the results of the game performance calculation, and the results of the icon control process. In addition, the sound processing section 130 performs a process of outputting BGM, sound effects, or game sounds such as voices from the sound output section 192 based on the results of the game process.

In the present embodiment, the game processing section 112 performs a process of activating the effect of the command according to the information on the character as a target of gameplay by the user and the point-of-view information of the user. For example, the game processing section 112 performs a process of activating the effect of the command according to the information set (specified) by the character information and the point-of-view information of the user (for example, the positional relationship information, the line-of-sight relationship information, or the gaze information).

Specifically, the game processing section 112 performs a process of changing at least one of the degree of the effect of the command and the contents of the effect of the command according to the character information and the point-of-view information of the user. For example, the game processing section 112 performs the activation process of the command such that, when the information set (specified) by the character information and the point-of-view information of the user (for example, the positional relationship information, the line-of-sight relationship information, or the gaze information) changes, at least one of the degree of the effect of the command and the contents of the effect of the command changes accordingly.

In this case, the character information is at least one of position information, direction information, game parameter information, body part information, posture information, and type information of the character, for example. The character is a gameplay element appearing in the game, which represents a person, an animal, a robot, or a moving body in the real world, for example, and is displayed as an object in the game image.

Specifically, the character as a target of gameplay by the user is a character that is a partner of gameplay by the user, for example. Taking a communication game with an opposite-sex character (personal relationship simulation game) as an example, the character is a partner (candidate) of communication with the user. For example, in the present embodiment, the display processing section 120 generates a first person point-of-view game image for the user, and displays the generated first person point-of-view image on the display section 220 of the HMD 200. This provides the user with virtual reality in which the user feels as if he or she enters into a game space (CG animation world). The character appears as a target of gameplay by the user in the game space (the object space or the virtual three-dimensional space). Accordingly, the user can feel the virtual reality as if a real person (the character) exists in front of him or her. As the character as a target of gameplay by the user, a character appearing as the user's foe or friend in a war game, RPG game, or sports game may be used.

The game parameters are parameters that are used in the game processes (the game progress process and others). For example, the game parameters are parameters representing the status or performance of the character and the user. For example, the game parameters of the character may be various parameters such as status parameter representing the mind or status of the character, a parameter representing the character's performance, a parameter related to the character's action, or a parameter related to the character's belongings. The game parameters of the character may be parameters representing the character's evaluation of the user.

The body part information of the character includes information on the kinds of the body parts (body part objects) of the character (such as head, chest, hip, legs, or hands), information on the positions of the body parts (relative positions to the representative position of the character), or information on the shapes of the body parts (the shapes of the body part objects). The posture information of the character is information on the posture specifying the motion of the character such as sitting, standing, walking, or running, for example. For example, when the character is represented by a skeleton model, shape information of the skeleton corresponds to the posture information of the character. The kind information of the character is called the type or attribute of the character. For the opposite-sex character, the character type may be an active type, a serious type, a childish type, or a neat type.

The point-of-view information of the user is at least one of the point-of-view position information and the line-of-sight direction information of the user, and the attribute information of the virtual camera, for example. The point-of-view position information is information on the position set as the point-of-view of the user in the game space (the object space or the virtual three-dimensional space), for example. The line-of-sight direction information is information indicating the line-of-sight direction of the user at that point-of-view. The virtual camera attribute information is information on the virtual camera set at the point-of-view of the user and may be various kinds of information such as angle-of-view information and binocular disparity information in stereoscopic viewing, for example.

Further specifically, the game processing section 112 performs the process of activating the effect of the command according to the positional relationship information between the user and the character. For example, in the case of first person point-of-view, the game processing section 112 activates the effect of the command according to the positional relationship information between the point-of-view position of the user and the position (representative position) of the character. The positional relationship information is information indicating a relationship between the position of the user (the point-of-view position or the position of the user character) and the position of the character (the representative position or the point-of-view position). The positional relationship information may be the distance between the user and the character (the distance in the game space), for example, but is not limited to this. For example, the positional relationship information may be information on directional relationship between the user and the character.

The game processing section 112 performs a process of activating the effect of a command corresponding to the line-of-sight relationship information indicating the relationship between the user's line-of-sight and the character. The line-of-sight relationship information is information indicating a relationship between the user's line-of-sight and the character, and for example, information indicating correlation between the user's line-of-sight and the character. For example, the line-of-sight relationship information is information relating to the direction in which the user's line-of-sight is oriented with respect to the position (representative position) and the body parts of the character.

The game processing section 112 also performs a process of activating the effect of a command according to the gaze information of the user. The gaze information is at least one of gazed part information as information on the body part of the character gazed at by the user, presence-or-absence of gaze information as information whether the user gazes at the character, gaze time information indicating the time during which the user gazes at the character, and gaze distance information indicating the distance between the user and the character when the user is gazing at the character.

2. Tracking Process

Figure 2A:
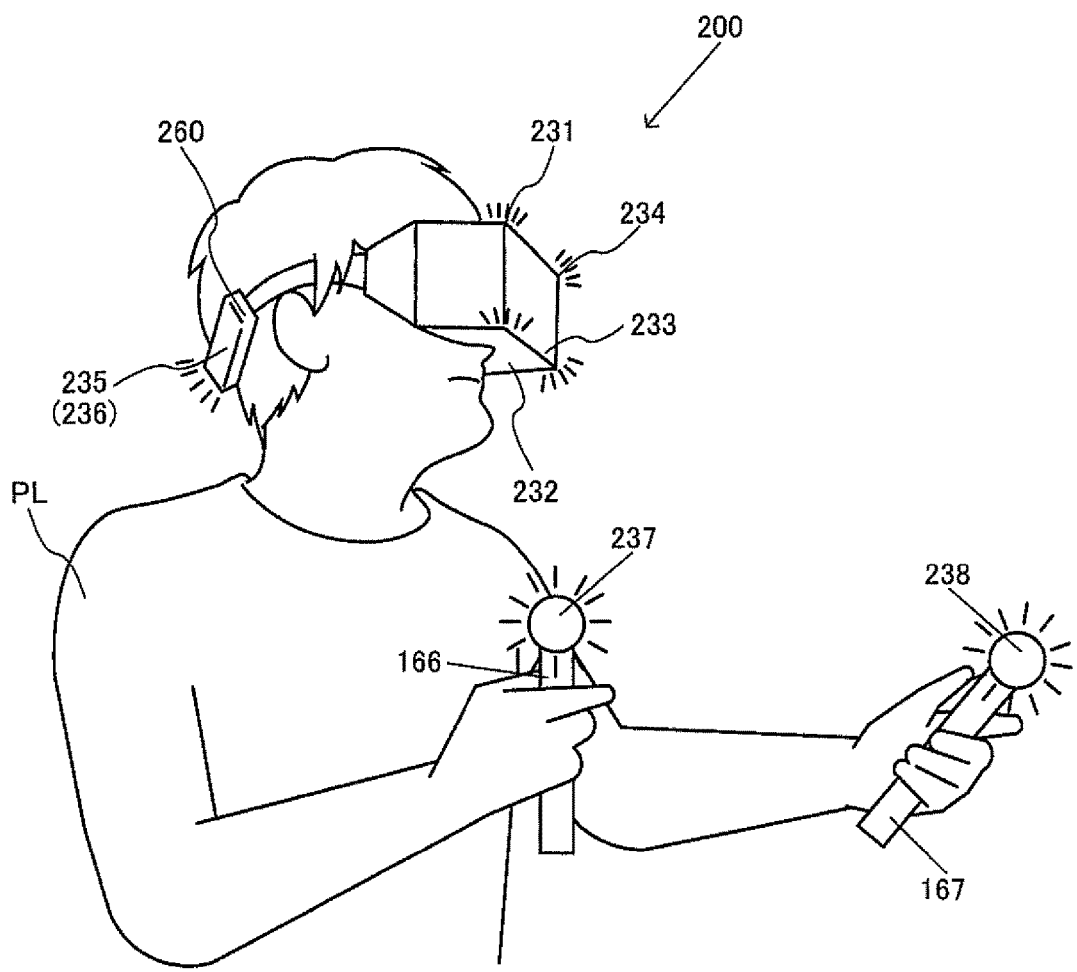
FIG. 2A and FIG. 2B illustrate an example of an HMD used in the present embodiment.
Figure 2B:
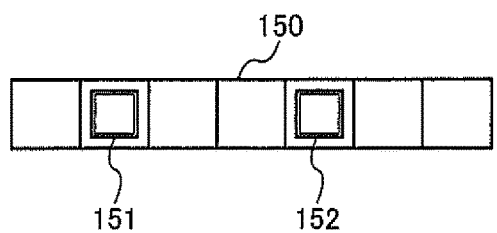

Next, an example of a tracking process will be described. FIG. 2A illustrates an example of the HMD 200 used in the simulation system in the present embodiment. The HMD 200 illustrated in FIG. 2A is provided with a plurality of light emitting elements 231 to 236. For example, these light emitting elements 231 to 236 are implemented with LEDs or the like. The light emitting elements 231 to 234 are provided on the front surface side of the HMD 200, and the light emitting element 235 and the light emitting element 236 (not illustrated) are provided on the back surface side. These light emitting elements 231 to 236 emit light in a wavelength band of visible light (light emission) for example. Specifically, the light emitting elements 231 to 236 emit light of colors different from each other. The image capturing section 150 illustrated in FIG. 2B is provided on the forward side of a user PL to capture an image of the light from the light emitting elements 231 to 236. Thus, the captured image obtained by the image capturing section 150 includes spots of the light from the light emitting elements 231 to 236. The head (HMD) of the user PL is tracked with image processing executed on the captured image. Thus the three-dimensional position and the facing direction of the head of the user PL (the point-of-view position and the line-of-sight direction) are detected.

For example, as illustrated in FIG. 2B, the image capturing section 150 is provided with first and second cameras 151 and 152. The position of the head of the user PL in a depth direction and the like can be detected by using first and second captured images respectively captured by the first and the second cameras 151 and 152. Based on motion detection information obtained by the motion sensor provided to the sensor section 210 of the HMD 200, the rotational angle (line-of-sight) of the head of the user PL can also be detected. Thus, with such an HMD 200, the display section 220 of the HMD 200 can display an image (an image as viewed from the virtual camera corresponding to the point-of-view of the user) of the virtual space (virtual three-dimensional space) corresponding to the direction in which the user PL is facing regardless of which of all 360 degrees directions he or she is facing. LEDs emitting infrared light, instead of the visible light, may be used as the light emitting elements 231 to 236. Furthermore, another method such as one using a depth camera or the like may be employed to detect the position and/or movement of the head of the user and the like.

The HMD 200 is provided with a headband 260 and a headphone terminal not illustrated. The user PL can hear game sound having undergone a three-dimensional acoustic process, for example, with a headphone 270 (sound output section 192) connected to the headphone terminal.

The user PL holds game controllers 166 and 167 as illustrated in FIG. 2A. The game controllers 166 and 167 corresponds to the operation section 160 illustrated in FIG. 1. The game controllers 166 and 167 are provided with light emitting elements 237 and 238. The positions and others of the game controllers 166 and 167 are detected in the same manner as in the case of the HMD 200 by imaging light from the light emitting elements 237 and 238 by the image capturing section 150. Thus, the user PL can input various kinds of operation information. The user may be enabled to input operation information through a head nodding or shaking action to be detected by the tracking process.

Figure 3A:
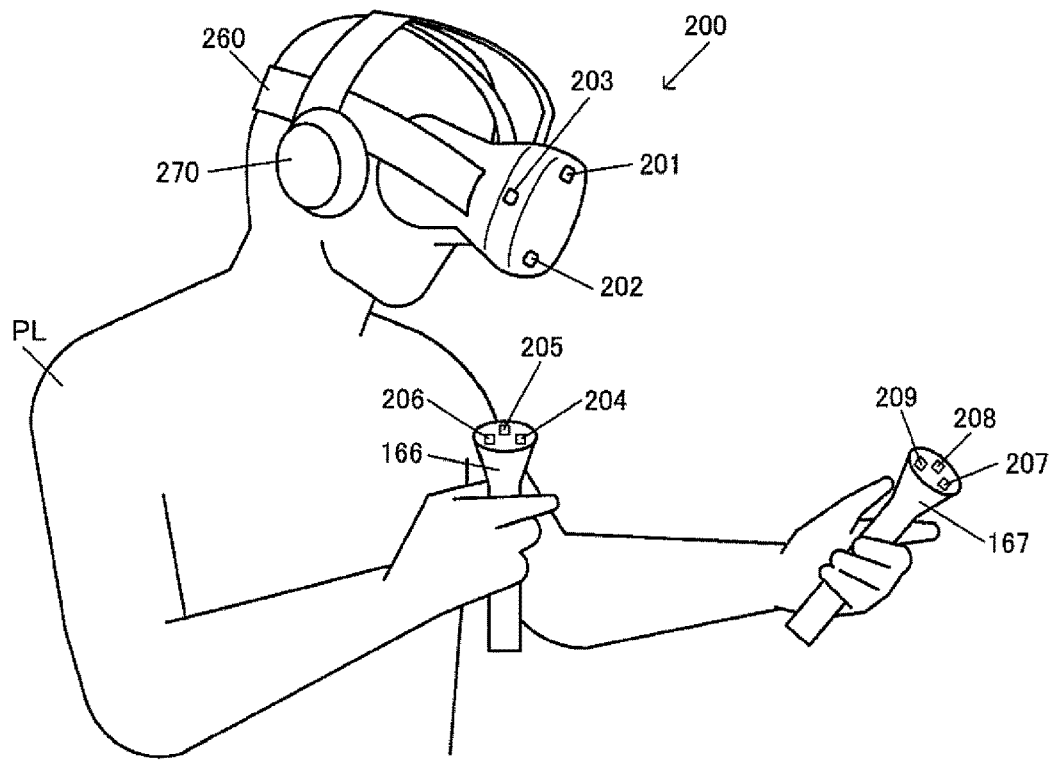
FIG. 3A and FIG. 3B illustrate another example of the HMD used in the present embodiment.

FIG. 3A illustrates another example of the HMD 200 used in the simulation system in the present embodiment. As illustrated in FIG. 3A, the HMD 200 is provided with a plurality of light receiving elements (photodiodes) 201, 202, and 203. The light receiving elements 201 and 202 are provided on the front surface side of the HMD 200, whereas the light receiving element 203 is provided on the right side surface of the HMD 200. Note that unillustrated light receiving elements are further provided on the left side surface, the upper surface, or the like of the HMD. The HMD 200 is provided with the headband 260, and the user PL wears the headphone 270.

Figure 3B:
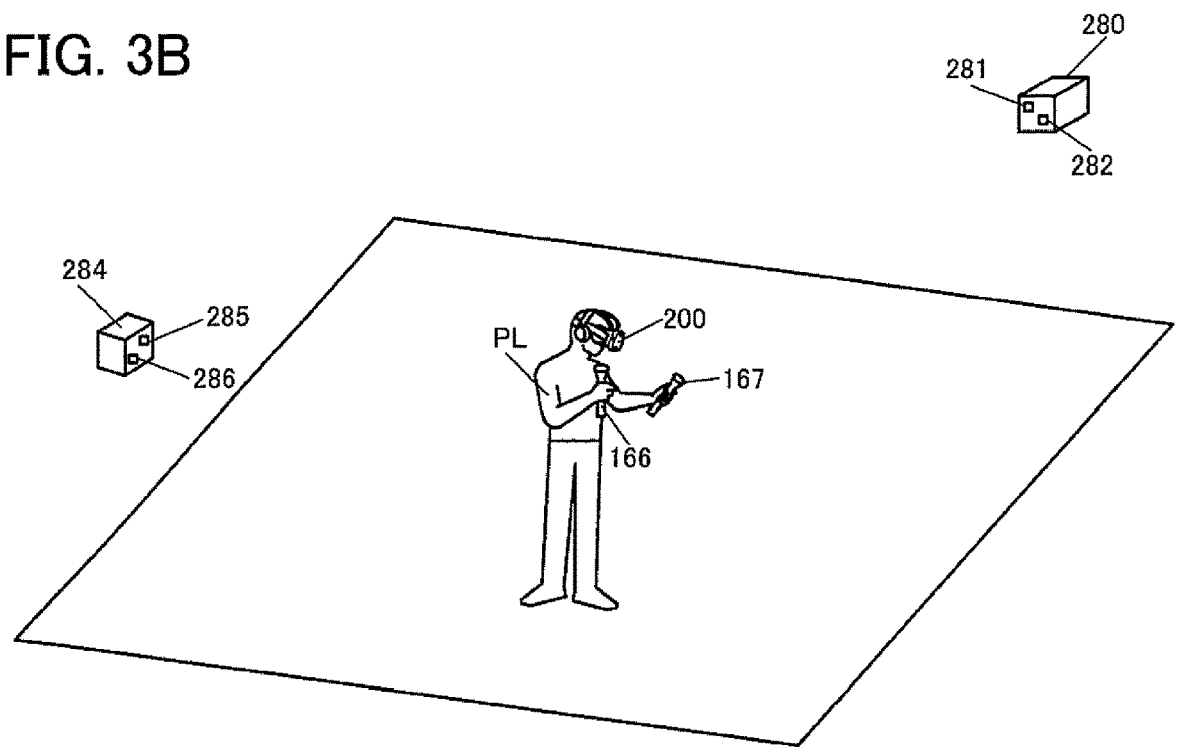

As illustrated in FIG. 3B, base stations 280 and 284 are installed in the periphery of the user PL. The base station 280 is provided with light emitting elements 281 and 282, and the base station 284 is provided with light emitting elements 285 and 286. For example, the light emitting elements 281, 282, 285, and 286 are implemented with LEDs that emit laser beams (such as infrared laser beams). The base stations 280 and 284 radially emit laser beams by using the light emitting elements 281, 282, 285, and 286, for example. With the light receiving elements 201 to 203 provided to the HMD 200 in FIG. 3A and the like receiving the laser beams from the base stations 280 and 284, the tracking of the HMD 200 is implemented so that the position and the facing direction of the head of the user PL (point-of-view position, line-of-sight direction) can be detected.

As illustrated in FIG. 3A, the game controllers 166 and 167 held by the user PL are provided with light receiving element 204 to 206 and 207 to 209. The positions and others of the game controllers 166 and 167 are detected in the same method as in the case of the HMD 200 by receiving laser beams from the light emitting elements 281, 282, 285, and 286 of the base stations 280 and 284 by the light receiving elements 204 to 206 and 207 to 209. Thus, the user PL can input various kinds of operation information.

The tracking process for detecting the point-of-view position and/or line-of-sight direction (the position and/or direction of the user) of the user is not limited to the method described with reference to FIG. 2A to FIG. 3B. For example, the tracking process may be implemented solely by the HMD 200 by using the motion sensor and the like provided to the HMD 200. Specifically, the tracking process is implemented without providing external devices such as the image capturing section 150 in FIG. 2B and the base stations 280 and 284 in FIG. 3B. Alternatively, various point-of-view tracking processes such as known eye tracking, face tracking, or head tracking can be employed to detect the point-of-view information such as the point-of-view position and the line-of-sight direction of the user. In an example of employing the eye tracking, the position, the shape, and the like of the pupil of each of the left and the right eyes of the user are recognized. Then, the tracking process is implemented with the point-of-view information on the user acquired by identifying the positions and the line-of-sight directions of the left and the right eyes. For example, the eye tracking can be implemented by capturing images of the left and the right eyes of the user with the image capturing section, and performing an image recognition process, for the pupil or the like, on the captured images. When the face tracking is employed, an image of the face of the user is captured by the image capturing section, and an image recognition process for the face is performed. Then, the tracking process is implemented with the point-of-view position and the line-of-sight direction of the user obtained by identifying the position and the orientation of the face of the user based on a result of the image recognition process.

3. Method According to the Present Embodiment

Next a method according to the present embodiment is described in detail.

3.1 Description on Game

First, an overview of the game implemented with the method according to the present embodiment is described. This game is a communication game (personal relationship simulation game) in which the user communicates with an opposite-sex character to teach subjects, offer various kinds of advice, answer questions, and clear various events, thereby creating a favorable image of the user in the character. As an example of a game employing the method according to the present embodiment, a communication game with an opposite-sex character or the like will be mainly described below. However, the game employing the method according to the present embodiment is not limited to this but the method according to the present embodiment is also applicable to various games such as a battle game, an RPG game, a sports game, and an action game.

Figure 4:
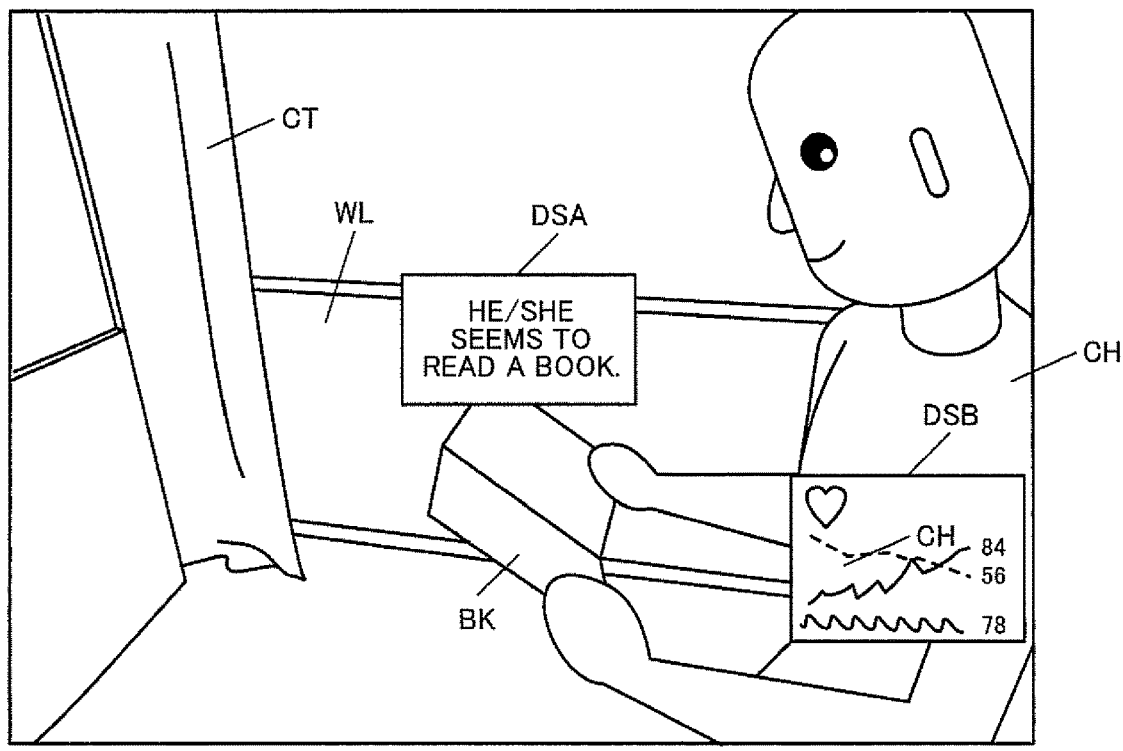
FIG. 4 is a diagram illustrating an example of a game image generated in the present embodiment.
Figure 5:
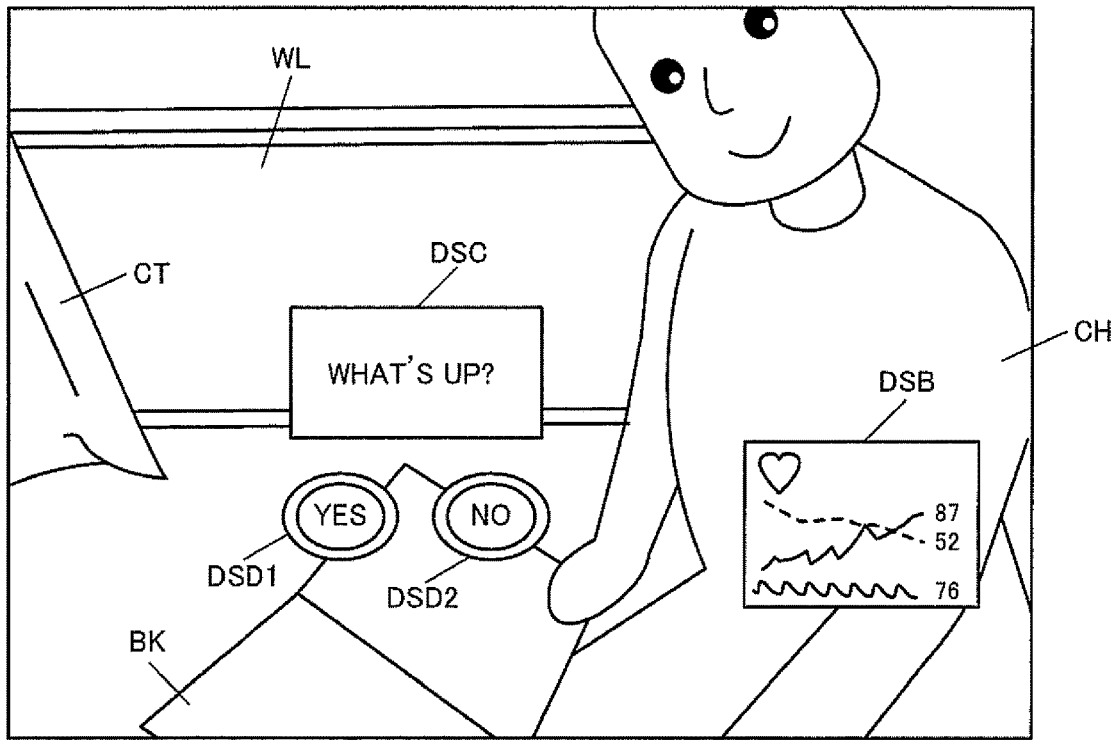
FIG. 5 is a diagram illustrating an example of a game image generated in the present embodiment.
Figure 6:
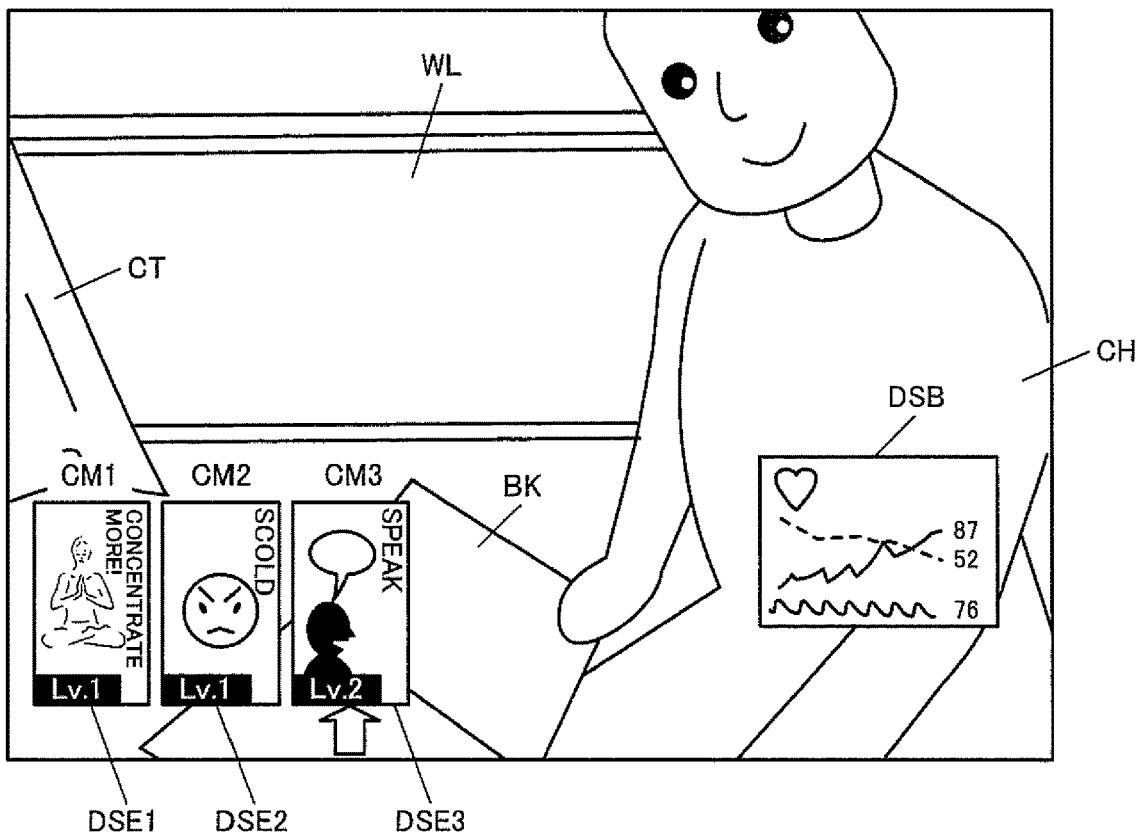
FIG. 6 is a diagram illustrating an example of a game image generated in the present embodiment.

FIG. 4 to FIG. 6 illustrate examples of game images generated by the simulation system (game system) according to the present embodiment. In the game implemented according to the present embodiment, the user (player) visits the home of a character CH as a home tutor to teach subjects and the like. The game has a plurality of stories in each of which the character CH of a different type appears. The user attains his or her purpose in each of the stories while enjoying intimate communication with the character CH.

The user wears the HMD 200 to play the game. When the user directs his/her line-of-sight to each of all the directions at 360 degrees, the image to be seen in the direction is displayed on the display section 220 of the HMD 200. For example, referring to FIG. 4, when the user directs his/her line-of-sight to the character CH, the image of the character CH being studying is displayed on the display section 220. On the other hand, when the user turns his/her head and directs his/her line-of-sight to the rear side of the user, the image of the furniture and others behind the character CH in the room is displayed on the display section 220. Therefore, the user can feel virtual reality as if he/she has entered in the game world. That is, it is possible to offer virtual reality to the user as if he/she has actually entered the room and is teaching subjects to the opposite-sex person in front of him/her so that the user can feel an increased sense of immersion in the game.

In a game image illustrated in FIG. 4, objects such as the character CH (a moving body in a broad sense), a book held by the character CH (an item in a broad sense), a curtain CT (a fixed object in a broad sense), and a wall WL (a background in a broad sense) are seen. In addition, information display objects DSA and DSB are displayed.

The information display object DSA is a display object for description display. For example, the information display object DSA describes that the character CH is reading the book. The information display object DSB is a display object for status display. As described later with reference to FIG. 7, the information display object DSB provides various kinds of status information of the character CH.

Referring to FIG. 4, when the user approaches the character CH and turns his/her line-of-sight to the character CH, a game image illustrated in FIG. 5 is displayed. FIG. 5 further illustrates information display objects DSC, DSD1, and DSD2. The information display object DSC is a display object for conversation display. For example, the information display object DSC shows the character CH's utterance 'What's up?_ The information display objects DSD1 and DSD2 are display objects for command selection (command input). For example, each of the display objects shows a command for the answer (YES or NO) to the utterance of the character CH.

Referring to FIG. 5, when the user selects the command for 'YES_, a game image as illustrated in FIG. 6 is displayed. FIG. 6 illustrates information display objects DSE1, DSE2, and DSE3. The information display objects DSE1, DSE2, and DSE3 are display objects (icons) for command selection. For example, the information display objects DSE1, DSE2, and DSE3 are associated with commands CM1, CM2, and CM3. For example, when the user selects the information display object DSE1, the effect of the command CM1 'concentrate more_ is activated. When the user selects the information display object DSE2, the effect of the command CM2 'scold_ is activated. When the user selects the information display object DSE3, the effect of the command CM3 'speak_ is activated.

The selection of the information display object (DSE1, DSE2, DSE3, DSD1, or DSD1) corresponding to the command is made by using the operation section 160 illustrated in FIG. 1. For example, the user uses the operation section 160 to perform a command operation of selecting the information display object (icon) corresponding to the desired command to activate the effect of the command corresponding to the selected information display object. Referring to FIG. 2A and FIG. 3A, for example, the user performs such a command operation by maneuvering the game controllers 166 and 167 by the both hands. Alternatively, the user may perform the command operation by using a game controller (not illustrated) connected in a wired manner. Alternatively, the user with the HMD 200 on his/her head may perform the command operation by turning his/her line-of-sight direction to the information display object corresponding to the command or making an action such as shaking his/her head vertically or horizontally.

Referring to FIG. 6, the user selects the information display object DSE3 corresponding to the command CM3 'speak_. Accordingly, the effect of the command CM3 'speak_ is activated. For example, the command CM3 is associated with voice data indicating the words corresponding to 'speak_ (for example, 'Yoo-hoo!_, 'Are you working hard?_ or 'Are you studying hard?_). When the command CM3 is activated, the voice data is reproduced and the voice of the words (sentence) is output from the sound output section 192 illustrated in FIG. 1.

In addition, when the command is activated (the effect of the command is activated), the game parameters of the character CH are also influenced. For example, when the command CM3 'speak_ is activated, the corresponding game parameters of the character CH also change.

Figure 7:
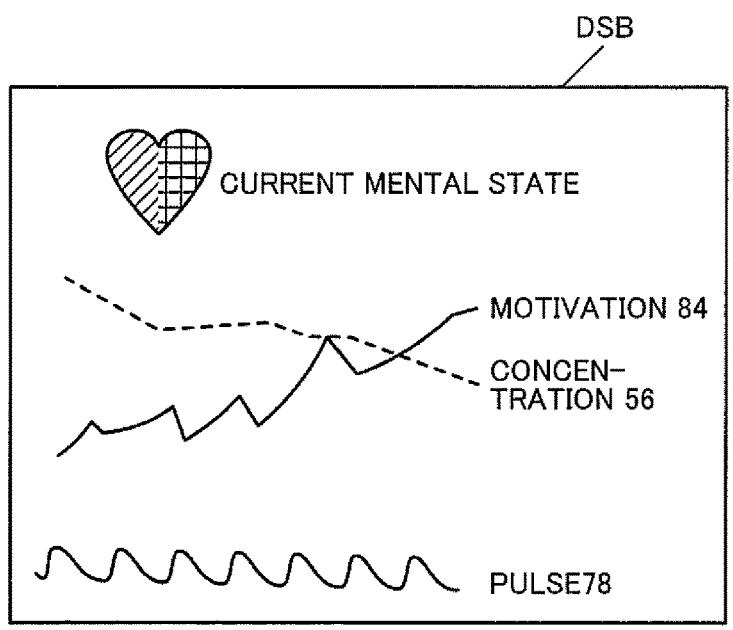
FIG. 7 is a drawing describing display of status of a character.

For example, referring to FIG. 4 to FIG. 6, the information display object DSB is displayed to inform the user about the status of the game parameters indicating various states of the character CH. The information display object DSB informs the user about the current mental state, motivation, concentration, pulse, and others of the character CH as illustrated in FIG. 7, for example. The mental state, motivation, concentration, and pulse are prepared as game parameters of the character CH.

The mental state of the character CH is represented by color, for example. In the game of the present embodiment, for example, assignments in a lesson are given and the lesson is ended after a lapse of a predetermined time. In addition, according to the achievement amounts of the assignments at the end of the lesson, for example, the user's performance of the game is determined. For example, when the user's performance of the game is high, the user is given a card of a command (action) that is highly effective or highly rare.

The assignments in the lesson are given red, green, and blue attributes for example, and the mental state of the character CH also has red, green, and blue components. For example, when the mental state of the character CH has a large amount of red component, the assignment with the red attribute can be cleared up immediately, whereas the assignments with the green and blue attributes are cleared up at a slow pace. Similarly, when the mental state of the character CH has a large amount of green component, the assignment with the green attribute can be cleared up immediately, whereas the assignments with the red and blue attributes are cleared up at a slow pace. Therefore, the user checks the mental state of the character CH displayed in the information display object DSB and causes the character CH to clear up the assignment with the attribute suited to the mental state so that the amount of the assignment achieved increases and the lesson can be properly completed.

In addition, as illustrated in FIG. 7, the game parameters of motivation and concentration are set to the character CH. The values of the game parameters of motivation and concentration vary between 0 to 100(%), for example, and the motivation and concentration become higher as the values are larger. When the value of the motivation becomes high, the speed of clearing up the assignment increases. On the other hand, the value of the concentration becomes lower with a lapse of time, and the concentration becomes larger at an increased rate or becomes unlikely to be lower depending on the mental state of the character CH. In addition, when the value of the concentration becomes lower than a predetermined value and the concentration of the character CH becomes lost, the character CH needs to take a break.

The pulse shown on the information display object DSB illustrated in FIG. 7 functions as a game parameter representing the heart-pounding feeling and favorable impression the character CH has on the user, for example. For example, when the degree of heart-pounding feeling of the character CH becomes higher, the pulse also becomes higher, the motivation improves, the concentration is less likely to be lower, and the speed of clearing up the assignment increases.

3.2 Change Process of Display Mode

As illustrated in FIG. 4 to FIG. 6, in the game implemented by the present embodiment various information display objects are displayed. In a conventional image generation system that displays pseudo three-dimensional images on a display section without using an HMD, two-dimensional display objects (sprite and the like) are two-dimensionally displayed as information display objects on a projection screen.

However, in a virtual reality (VR) system using an HMD, when two-dimensional display objects are displayed as information display objects for description display, status display, command selection, menu display, and others, the virtual reality for the user may become deteriorated or the screen may become hard to see. For example, in a VR space in which three-dimensional objects such as the character CH, the book BK, the curtain CT, and the wall WL illustrated in FIG. 4 are displayed in a stereoscopic manner, when only the information display objects are two-dimensionally displayed on the projection screen, the virtual reality becomes deteriorated. In addition, when a large number of two-dimensional information display objects are displayed, these information display objects overlap two-dimensionally or some objects are hidden behind the information display objects so that the screen becomes very hard to see.

Accordingly, in the present embodiment, at least one information display object is arranged in the line-of-sight direction of the user (the field of view range or the front direction of the user). For example, the information display object is formed from an object having three-dimensional coordinate values and is arranged in the virtual space similarly to the other objects in the virtual space. Specifically, the information display object controlled to follow a change in the point-of-view of the user (a change in at least one of the line-of-sight direction and the point-of-view position) is disposed in the virtual space. Further specifically, the information display object is disposed at a given depth position as seen in the line-of-sight direction of the user to follow a change in the point-of-view of the user.

Figure 8A:
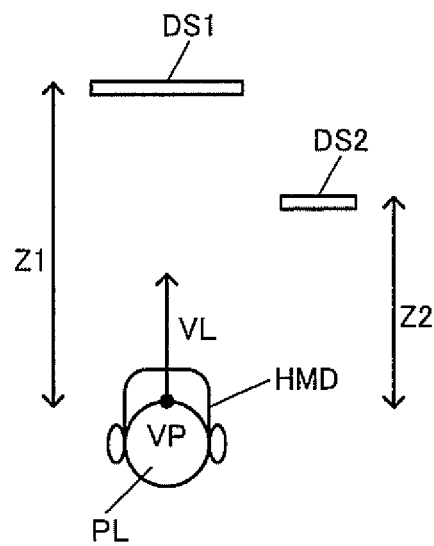
FIG. 8A to FIG. 8D are diagrams describing a display method of information display objects.

FIG. 8A to FIG. 8D are diagrams describing a display method of information display objects. Referring to FIG. 8A, for example, VP represents the point-of-view of the user PL wearing the HMD, and VL represents the line-of-sight direction of the user PL. The point-of-view VP and the line-of-sight direction VL are equivalent to the point-of-view and the line-of-sight direction of the virtual camera corresponding to the user PL.

Referring to FIG. 8A, information display objects DS1 and DS2 are disposed respectively at positions of depth values Z1 and Z2 as seen in the line-of-sight direction VL of the user PL. The depth values Z1 and Z2 are coordinate values of a Z coordinate axis in a point-of-view coordinate system (camera coordinate system), for example. The information display objects DS1 and DS2 are implemented by billboard polygons, for example. Specifically, the information display objects DS1 and DS2 are implemented by mapping images of characters, icons, or graphics for description display, status display, conversation display, command selection display, or menu display as described above with reference to FIG. 4 to FIG. 6 to the billboard polygons. The billboard polygons (billboard primitive surfaces) are polygons (primitive surfaces) that are arranged to face (appropriately face) the point-of-view VP of the user PL (virtual camera). For example, the billboard polygons as the information display objects DS1 and DS2 are arranged to be orthogonal (approximately orthogonal) to the line-of-sight direction VL (line-of-sight direction vector). For example, the information display objects DS1 and DS2 are arranged such that normal directions of surfaces of the billboard polygons are parallel to the line-of-sight direction VL. The arrangement direction of the billboard polygons is not limited to the direction as described above but the billboard polygons can be set in any of various arrangement directions. In addition, the information display objects may be implemented by display objects different in form from billboard polygons. For example, the information display objects may be implemented by three-dimensional objects formed from a plurality of primitive surfaces (polygons).

Figure 8B:
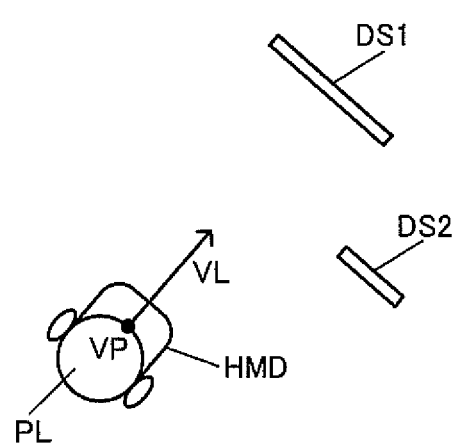

In the present embodiment, the information display objects DS1 and DS2 are controlled to follow a change in the line-of-sight direction VL of the user PL. Referring to FIG. 8B, for example, the line-of-sight direction VL of the user PL changes to the right side. For example, the user PL wearing the HMD faces to the right, and thus the line-of-sight direction of the virtual camera in the virtual space also changes to the right side. In this case, as illustrated in FIG. 8B, the positions and directions of the information display objects DS1 and DS2 change to follow the change in the line-of-sight direction VL. Referring to FIG. 8B, for example, the billboard polygons constituting the information display objects DS1 and DS2 are also arranged to face the point-of-view VP of the user PL.

Figure 8C:
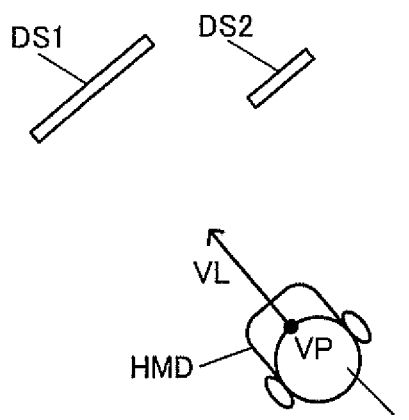

Referring to FIG. 8C, the line-of-sight direction VL of the user PL changes to the left side. For example, the user PL wearing the HMD faces to the left, and thus the line-of-sight direction of the virtual camera in the virtual space also changes to the left side. In this case, as illustrated in FIG. 8C, the positions and directions of the information display objects DS1 and DS2 change to follow the change in the line-of-sight direction VL. Referring to FIG. 8C, for example, the billboard polygons constituting the information display objects DS1 and DS2 are also arranged to face the point-of-view VP of the user PL.

Figure 8D:
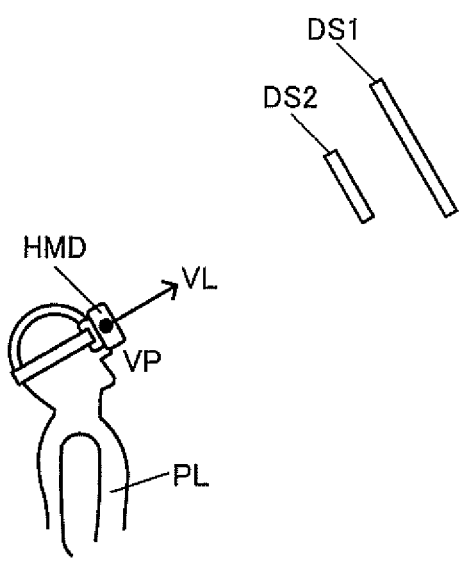

Referring to FIG. 8D, the line-of-sight direction VL of the user PL changes upward. In this case, as illustrated in FIG. 8D, the positions and directions of the information display objects DS1 and DS2 change to follow the change in the line-of-sight direction VL. Similarly, when the line-of-sight direction of the user PL changes downward, the positions and directions of the information display objects DS1 and DS2 change to follow the change in the line-of-sight direction.

In this manner, according to the display method illustrated in FIG. 8A to FIG. 8D, the information display objects are three-dimensionally arranged in the virtual space similarly to the other objects in the virtual space. Therefore, it is possible to solve the problem of deterioration in the virtual reality for the user due to the display of the information display objects. Specifically, according to a conventional method by which two-dimensional information display objects are planarly displayed, there arises a problem of deterioration in the virtual reality due to the presence of the information display objects. However, according to the method in the present embodiment by which information display objects are three-dimensionally arranged in the virtual space, this problem can be prevented. In addition, arranging three-dimensionally the information display objects makes it possible to, even when a plurality of information display objects are to be displayed, display the information display objects in an appropriate representation that is easy to see for the user. For example, as illustrated in FIG. 8A to FIG. 8D, it is possible to arrange a plurality of information display objects (DS1 and DS2) at different depth values (Z1 and Z2) so that the information display objects can be displayed in an appropriate representation that is easy to see for the user. In addition, according to the display method illustrated in FIG. 8A to FIG. 8D, the information display objects are always displayed in front of the user. Therefore, even when the line-of-sight direction of the user changes to any of various directions, the information display objects are displayed in front of the user so that various kinds of information necessary for the user can be appropriately presented using the information display objects.

The display method of the information display objects is not limited to the method illustrated in FIG. 8A to FIG. 8D but various modification examples are possible. Each of the information display objects does not necessarily follow a change in the line-of-sight direction at any time but the information display object may not follow exceptionally. Alternatively, the information display object may be displayed to follow a change in the line-of-sight direction with a time delay. For example, in the case where the line-of-sight direction changes greatly (the change angle, change speed, or change acceleration of the line-of-sight direction becomes equal to or greater than a predetermined value), the information display object may not follow the change in the line-of-sight direction or may follow the change with a time delay. In addition, after a lapse of a given time, a return process such as rearranging the information display object may be performed. Alternatively, a specific information display object may not follow a change in the line-of-sight direction of the user. For example, the information display object for displaying the status of a specific object (for example, a character as a target of gameplay by the user) may be controlled to be displayed in the vicinity of the specific object.

FIG. 8A to FIG. 8D illustrate the case in which the information display objects follow a change in the line-of-sight direction of the user. Alternatively, each of the information display objects may follow a change in the point-of-view position of the user. For example, when the point-of-view position of the user (user position) moves upward, downward, leftward, or rightward, the information display object is moved upward, downward, leftward, or rightward to follow this movement. The information display object may follow only a change in the line-of-sight direction of the user, may follow only a change in the point-of-view position, or may follow both a change in the line-of-sight direction and a change in the point-of-view position. However, the following description will be given mainly as to the case in which a change in the point-of-view of the user is a change in the line-of-sight direction of the user as an example, for the sake of simplicity.

According to the method illustrated in FIG. 8A to FIG. 8D, it is possible to display the information display object in an appropriate manner so as not to deteriorate the virtual reality for the user. However, since there are a large number of objects other than the information display object in the virtual space, it has been discovered that the relationship with these objects causes a problem.

Figure 9A:
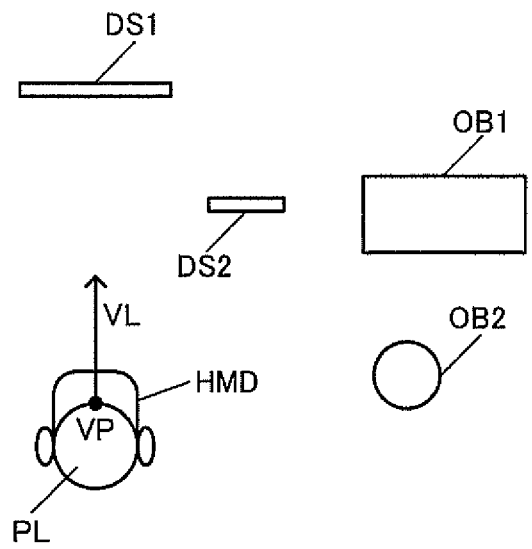
FIG. 9A and FIG. 9B are diagrams describing a collision between an information display object and an object.

For example, referring to FIG. 9A, the information display objects DS1 and DS2 are arranged in the front direction of the user PL and other objects OB1 and OB2 are also arranged in the virtual space. The objects OB1 and OB2 are objects equivalent to, for example, the character CH (moving body), the book BK (item), the curtain CT (fixed object), the wall WL (background), and the like illustrated in FIG. 4. In addition, referring to FIG. 9A, there is no collision between the information display objects DS1 and DS2 and the objects OB1 and OB2.

Figure 9B:
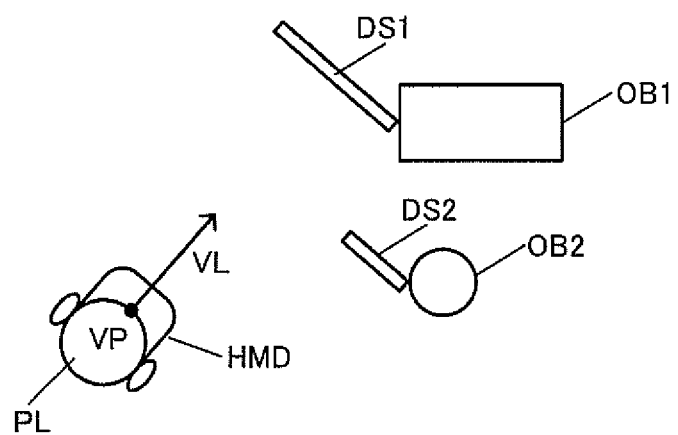

On the other hand, as illustrated in FIG. 9A and FIG. 9B, when the line-of-sight direction VL of the user PL changes, the positions of the information display objects DS1 and DS2 change to follow the change in the line-of-sight direction VL. In this case, referring to FIG. 9B, there are events of collision (approach or interference) between the information display objects DS1 and DS2 and the objects OB1 and OB2. In this event; the information display objects DS1 and DS2 cut into the objects OB1 and OB2, for example, so that the information display objects DS1 and DS2 may become partially lost or the objects OB1 and OB2 may become partially lost. For example, when the line-of-sight direction of the user PL slightly changes in the state illustrated in FIG. 9B, flicker occurs to greatly deteriorate the display quality.

Also in the case where the information display object follows a change in the point-of-view position of the user (user position), when the point-of-view position of the user changes upward, downward, leftward, or rightward, the information display object may collide with the object.

Accordingly, in the present embodiment when the information display objects DS1 and DS2 and the objects OB1 and OB2 have entered into the positional relationship as illustrated in FIG. 9B, the change process of the display mode of the information display objects DS1 and DS2 or the objects OB1 and OB2 is performed. Specifically, the change process of the display mode to solve a display problem caused by the collision (approach or interference) as illustrated in FIG. 9B is performed.

Figure 10A:
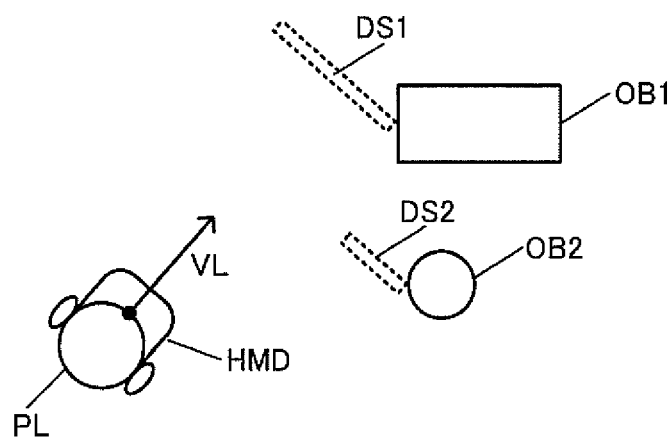
FIG. 10A to FIG. 10C are diagrams describing a method for changing a display mode in the present embodiment.

For example, referring to FIG. 10A, the display mode of the information display objects DS1 and DS2 is changed. Specifically, the process of erasing the information display objects DS1 and DS2 or semi-transparentizing the information display objects DS1 and DS2 is performed. On the other hand, the change process of the display mode is not performed on the objects OB1 and OB2. The erase process of the information display objects DS1 and DS2 can be performed by excluding the information display objects DS1 and DS2 from a display list (display object list), for example. The semi-transparentization process of the information display objects DS1 and DS2 can be performed by bringing the semi-transparency (value) of the information display objects DS1 and DS2 to transparency, for example. Alternatively, the information display objects DS1 and DS2 may be changed into frame models or the like, for example, such that characters, icons, or graphics for description display or status display are erased. Alternatively, the color information of the information display objects DS1 and DS2 may be changed. For example, the colors of the information display objects DS1 and DS2 are changed into less visible colors (undistinguished colors) or colors melted into the background.

Figure 10B:
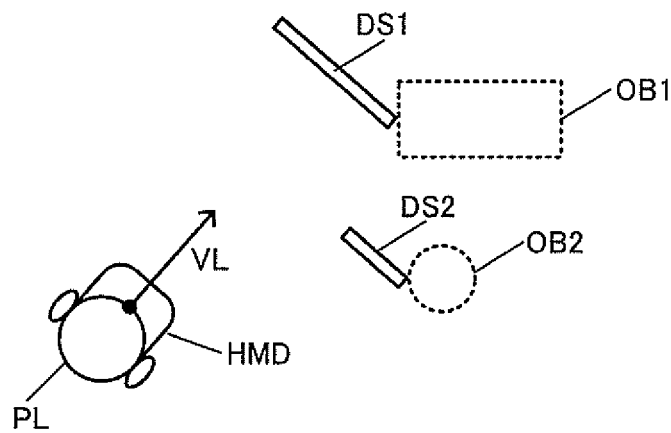

Referring to FIG. 10B, the display mode of the objects OB1 and OB2 is changed. Specifically, the process of erasing the objects OB1 and OB2 or semi-transparentizing the objects OB1 and OB2 is performed. On the other hand, the change process of the display mode is not performed on the information display objects DS1 and DS2. The erase process of the objects OB1 and OB2 can be performed by excluding the objects OB1 and OB2 from the display list, for example. The semi-transparentization process of the objects OB1 and OB2 can be performed by bringing the semi-transparency of the objects OB1 and OB2 to transparency, for example. Alternatively, the objects OB1 and OB2 may be changed into frame models or the like, for example, such that properties such as color and texture are not displayed. Alternatively, the color information of the objects OB1 and OB2 may be changed. For example, the colors of the objects OB1 and OB2 are changed into less visible colors (undistinguished colors) or colors melted into the background.

Figure 10C:
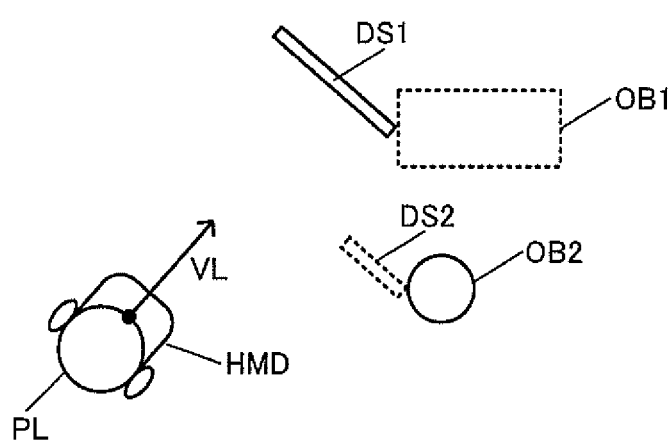

Referring to FIG. 10C, in the relationship between the information display object DS1 and the object OB1, the display mode of the object OB1 is changed such that the object OB1 is erased or semi-transparentized. For example, when the information display object DS1 is a display object with a high priority or a high importance level, the display mode of the object OB1 is changed, not the display mode of the information display object DS1. On the other hand, in the relationship between the information display object DS2 and the object OB2, the display mode of the information display object DS1 is changed such that the information display object DS1 is erased or semi-transparentized. For example, when the information display object DS2 is a display object with a low priority or a low importance level, the display mode of the information display object DS2 is changed, not the display mode of the object OB2.

That is, when the information display object DS1 is of the first type (for example, a display object with a high importance level or a high priority), the display mode of the object OB1 is changed. On the other hand, when the information display object DS2 is of the second type (for example, a display object with a low importance level or a low priority), the display mode of the information display object DS2 is changed.

For example, referring to table data illustrated in FIG. 11A, information display objects DSF1, DSF2, and DSF3 are associated with types TPA, TPB, and TPA. The table data is stored in the storage section 170 illustrated in FIG. 1. The type TPA is a type with a low priority or a low importance level, for example, and thus the display mode of the information display object is changed in the event of a collision (approach or interference) with an object. For example, the information display object is erased or semi-transparentized. On the other hand, the type TPB is a type with a high priority or a high importance level, the display mode of the information display object is not changed in the event of a collision with an object. For example, the information display object is not erased or semi-transparentized but the object is erased or semi-transparentized.

In the table data of FIG. 11B, information display objects DSG1, DSG2, and DSG3 are associated with priorities (importance levels) PRA, PRB, and PRC. The table data is stored in the storage section 170 illustrated in FIG. 1. In the event of a collision between the information display objects DSG1, DSG2, and DSG3 and other objects, the change process of the display mode is performed by using the priorities (importance levels) PRA, PRB, and PRC associated with the information display objects DSG1, DSG2, and DSG3. For example, the change process of the display mode is not performed on the information display object associated with a high priority (importance level) even when the information display object has entered into the positional relationship of collision or approach with an object. Thus, the display mode of the object is changed, for example. On the other hand, the change process of the display mode is performed on the information display object associated with a low priority (importance level) when the information display object has entered into the positional relationship of collision or approach with an object. Thus, the display mode of the object is not changed, for example. In this case, the objects may also be associated with priorities (importance levels) so that the process of comparison between the priority (importance level) associated with the information display object and the priority (importance level) associated with the object can be performed. Then, based on the result of the comparison process, the change process of the display mode is performed. For example, when the information display object is higher in priority (importance level) than the object, the display mode of the object is changed. On the other hand, when the object is higher in priority (importance level) than the information display object, the display mode of the information display object is changed.

In this manner, in the present embodiment, it is possible to implement the change process of the display mode in an appropriate manner according to the type, priority, or importance level of the information display object. For example, for a specific type of information display object even in the case of a positional relationship of collision or approach with an object, only the display mode of the object can be changed or in reverse only the display mode of the information display object can be changed. Alternatively, when the information presented by the information display object is high in priority or importance level, even in the event of a positional relationship of collision or approach with an object, the display mode of the information display object is not changed but only the display mode of the object is changed.

In addition, in the present embodiment, the change process of the display mode is performed using the priority or importance level associated with the information display object as illustrated in FIG. 11B. Accordingly, associating the priority or the importance level in advance with the information display object makes it possible to execute the appropriate change process of the display mode using the priority or the importance level.

For example, referring to FIG. 4 to FIG. 6, the information display objects (DSD1, DSD2, and DSE1 to DSE3) for command selection are information display objects with high priorities or importance levels. For example, in the case where the line-of-sight direction of the user changes to bring an information display object for command selection and an object into a positional relationship of collision or approach, if the information display object is erased or semi-transparentized, the user will not be able to select (input) a command and the progress of the game will be stopped. Therefore, such an information display object for command selection is associated with a high priority or importance level so that, in the event of a positional relationship of collision or approach with an object, the erase process or semi-transparentization process of the information display object is not performed but the erase process or semi-transparentization process of the object is performed.

On the other hand, the information display object for description display (DSA) is an information display object with a not so high priority or importance level, and thus in the event of a positional relationship of collision or approach with an object, erasing or semi-transparentizing the information display object for description display would not greatly impede the progress of the game. Therefore, such an information display object for description display is associated with a low priority or importance level, and in the event of a positional relationship of collision or approach with an object, the erase process or semi-transparentization process of the information display object is performed. This makes it possible to implement the appropriate display process reflecting the priority or importance level of the information display object.

In the present embodiment, the change process of the display mode may be performed according to the length of a time elapsed since the display of the information display object.

Figure 12:
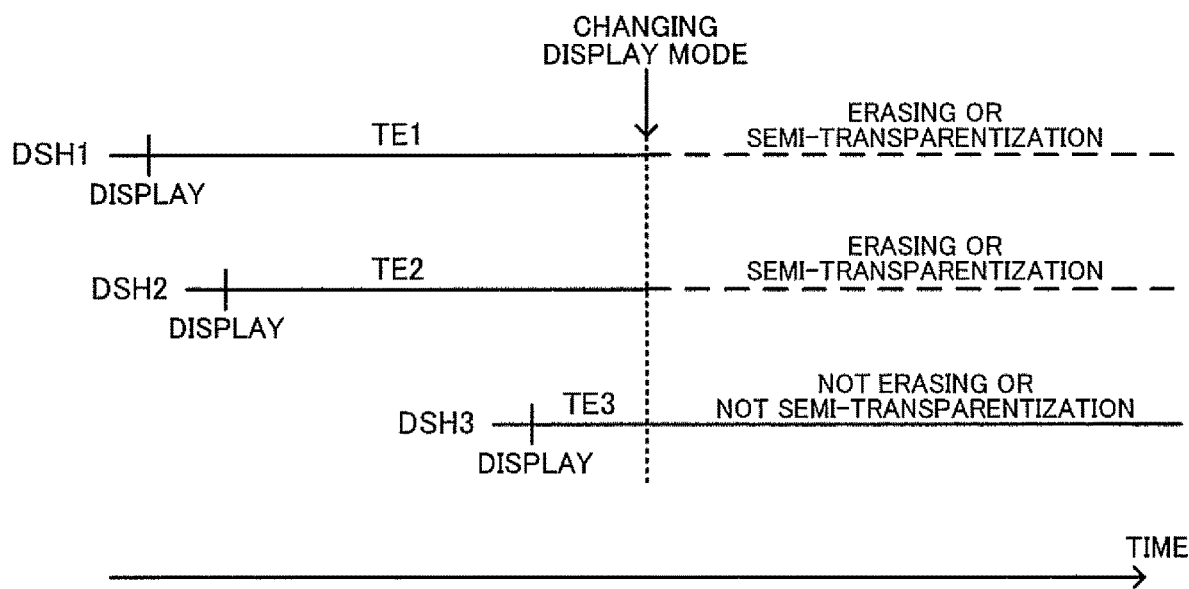
FIG. 12 is a diagram describing a method for changing the display mode according to the lengths of time elapsed from display of the information display objects.

For example, referring to FIG. 12, information display objects DSH1 and DSH2 are subjected to the change process of the display mode at timings after long elapsed times TE1 and TE2. On the other hand, an information display object DSH3 is subjected to the change process of the display mode at a timing after a short elapsed time TE3. In this case, the information display objects DSH1 and DSH2 with the long elapsed times TE1 and TE2 since the display are subjected to the change process of the display mode such as erase or semi-transparentization. On the other hand, the information display object DSH3 with the short elapsed time TE3 since the display is not subjected to the change process of the display mode such as erase or semi-transparentization.

For example, as for the information display objects DSH1 and DSH2 with the long elapsed times TE1 and TE2 since the display, there is a high possibility that the user has already seen the information display objects DSH1 and DSH2 during the long elapsed times TE1 and TE2, and it is thus considered that information transmission from the information display objects DSH1 and DSH2 has been sufficiently performed. Therefore, the information display objects DSH1 and DSH2 are subjected to the change process of the display mode such as erase or semi-transparentization in the event of a positional relationship of collision or approach with an object.

On the other hand, as for the information display object DSH3 with the short elapsed time TE3 since the display, there is a low possibility that the user has sufficiently seen the information display object DSH3 during the short elapsed time TE3, and it is thus considered that information transmission from the information display object DSH3 is insufficient. Therefore, the information display object DSH3 is not subjected to the change process of the display mode such as erase or semi-transparentization even in the event of a positional relationship with collision or approach with an object.

Specifically, when a large number of information display objects are displayed, if all the information display objects in a positional relationship of collision or approach with objects are erased or semi-transparentized, information transmission from the information display objects will be insufficient. In this respect, according to the method illustrated in FIG. 12, it is determined whether to perform the change process of the display mode based on the elapsed time since the display, which makes it possible to prevent this problem in an effective manner.

3.3 Change Process of Display Mode and Specific Examples of Determination on Positional Relationship Next, the change process of the display mode and specific examples of determination on positional relationship will be described. Examples of the change process of the display mode include the erase process or semi-transparentization process of an information display object or an object, the cancel process of following by an information display object in the line-of-sight direction of the user, the movement process of an information display object or an object, and the size change process of an information display object or an object.

Figure 13A:
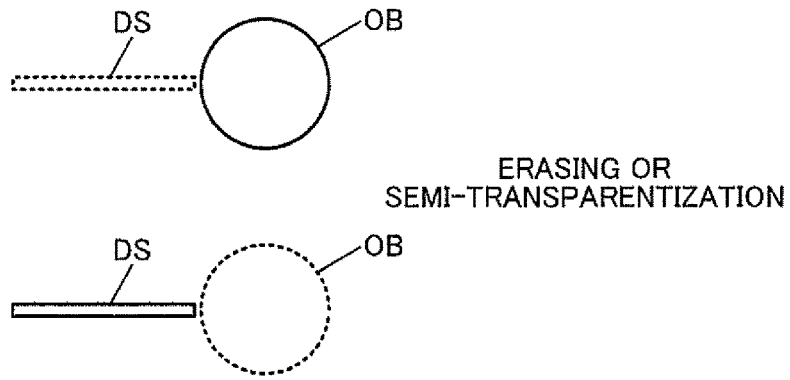
FIG. 13A to FIG. 13C are diagrams illustrating a specific example of the charge process of the display mode of the information display object.

For example, referring to FIG. 13A, as the change process of the display mode, the erase process or semi-transparentization process of an information display object DS or an object OB is performed. For example, when the information display object DS and the object OB have entered into a positional relationship of collision or approach, either of them is erased or semi-transparentized.

Figure 13B:
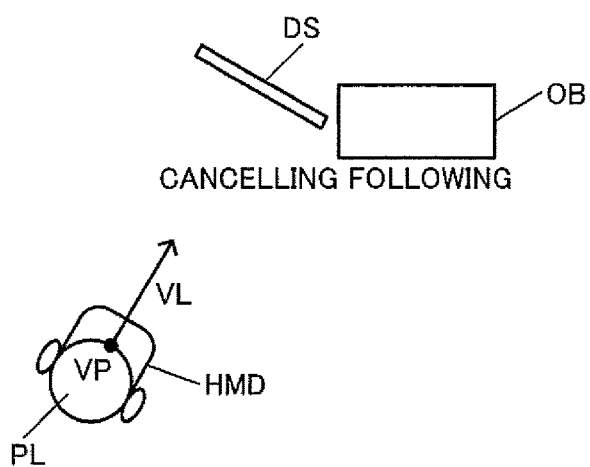
Figure 13C:
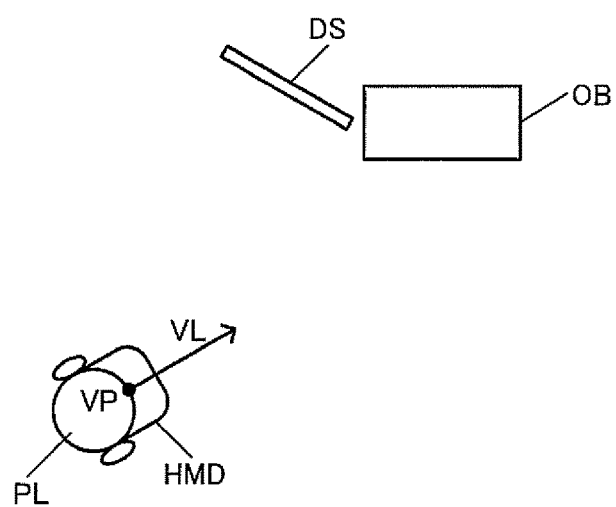

Referring to FIG. 13B and FIG. 13C, as the change process of the display mode, the cancel process of following by the information display object DS in the line-of-sight direction VL of the user PL is performed. For example, in the present embodiment, as described above with reference to FIG. 8A to FIG. 8D, the information display object DS is controlled to follow a change in the line-of-sight direction VL of the user PL.

In contrast to this, referring to FIG. 13B, when the information display object DS and the object OB have entered into the positional relationship of collision or approach, the control of following is canceled. Accordingly, as illustrated in FIG. 13C, even when the line-of-sight direction VL of the user PL changes, the position of the information display object DS does not change. Therefore, it is possible to prevent a problem of the information display object DS colliding with and cutting into the object OB.

Figure 14A:
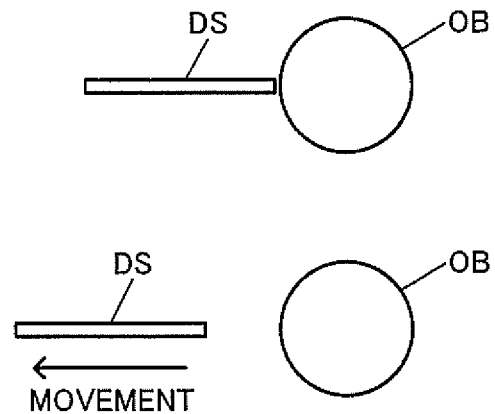
FIG. 14A to FIG. 14C are diagrams illustrating a specific example of the charge process of the display mode of the information display object.

In addition, referring to FIG. 14A, when the information display object DS and the object OB have entered into a positional relationship of collision or approach, the information display object DS is moved so that they are separated from each other, for example. For example, referring to FIG. 14A, since the object OB is positioned on the right side of the information display object DS, the information display object DS is moved to the left side so that they are separated from each other. Accordingly, even when the information display object DS and the object OB have entered into a positional relationship of collision or approach, they can be separated from each other by the movement, thereby to display a more appropriate image. In the case of FIG. 14A, the information display object DS is moved. Alternatively, the object OB may be moved instead. Specifically, the object OB is moved to the right side so that the information display object DS and the object OB are separated from each other.

Figure 14B:
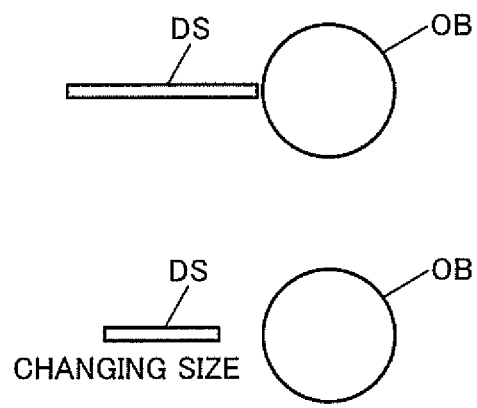

Referring to FIG. 14B, when the information display object DS and the object OB have entered into a positional relationship of collision or approach, the size of the information display object DS is changed. For example, the size of the information display object DS is reduced so that the right end portion of the information display object DS and the left end portion of the object OB are separated from each other to avoid a collision therebetween. Alternatively, the size of the object OB may be reduced.

Figure 14C:
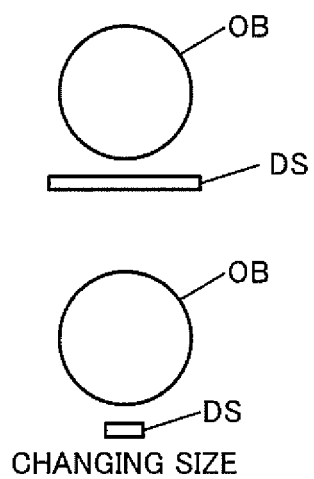

Referring to FIG. 14C, the information display object DS and the object OB are in the positional relationship in which the information display object DS is closer to the front side of the point-of-view of the user than the object OB. In this case, as the change process of the display mode, the size of the information display object DS is reduced, for example. This makes it possible to prevent a situation in which the object OB becomes invisible behind the information display object DS. In the case where the object OB is closer to the front side of the user than the information display object DS, the size of the object OB may be reduced.

Next, a specific example of determination on positional relationship between the information display object and the object will be described. In the present embodiment, the determination section 115 illustrated in FIG. 1 determines the positional relationship between the information display object and the object. When the determination section 115 determines that they have entered into a positional relationship of approach or collision, the change process of the display mode of the information display object or the object is performed. Specifically, the determination section 115 determines the positional relationship based on the three-dimensional coordinate values of the information display object and the object, the depth values of the information display object and the object, or the two-dimensional coordinate values when the information display object and the object are projected onto a plane.

Figure 15A:
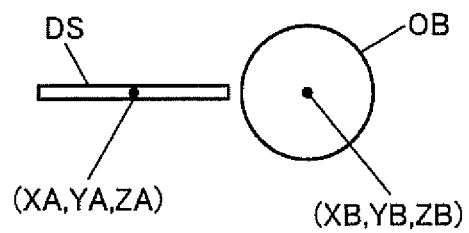
FIG. 15A and FIG. 15B are diagrams illustrating specific examples of a method for determining a positional relationship.

For example, referring to FIG. 15A, the determination section 115 determines whether they have entered into a positional relationship of approach using three-dimensional coordinate values (XA, YA, ZA) of the information display object DS and three-dimensional coordinate values (XB, YB, ZB) of the object OB. Specifically, the determination section 115 determines the positional relationship of approach by using, in addition to these three-dimensional coordinate values, the size information and shape information of the information display object DS and the object OB. For example, the positional relationship of approach can be determined by determining whether the distance between an end portion (for example, the right end portion) of the information display object DS and an end portion (for example, the left end portion) of the object OB has become equal to or less than a predetermined distance. Alternatively, the determination section 115 may determine the positional relationship of approach based on the three-dimensional coordinate values of a plurality of vertexes of polygons constituting the information display object DS and the object OB.

Figure 15B:
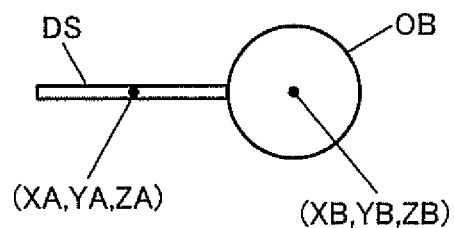
Figure 15B:
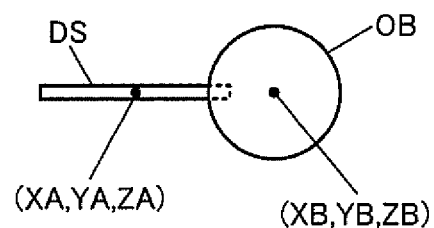

Referring to FIG. 15B, the determination section 115 determines whether they have entered into a positional relationship of collision by using the three-dimensional coordinate values (XA, YA, ZA) of the information display object DS and the three-dimensional coordinate values (XB, YB, ZB) of the object OB. The determination on positional relationship of collision can be implemented by a publicly known collision process (hit determination). For example, the determination on positional relationship of collision can be implemented by determining whether the information display object DS and the object OB have crossed by the publicly known collision process.

Figure 16A:
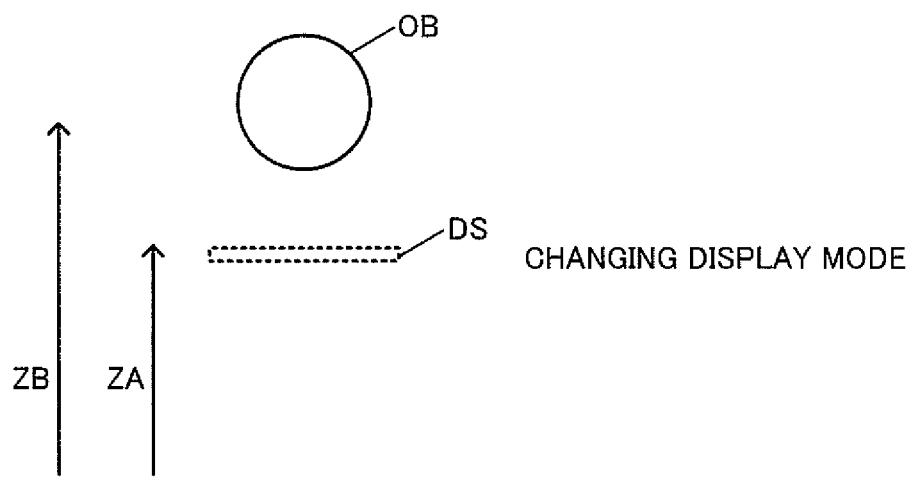
FIG. 16A and FIG. 16B are diagrams illustrating specific examples of a method for determining a positional relationship.
Figure 16B:
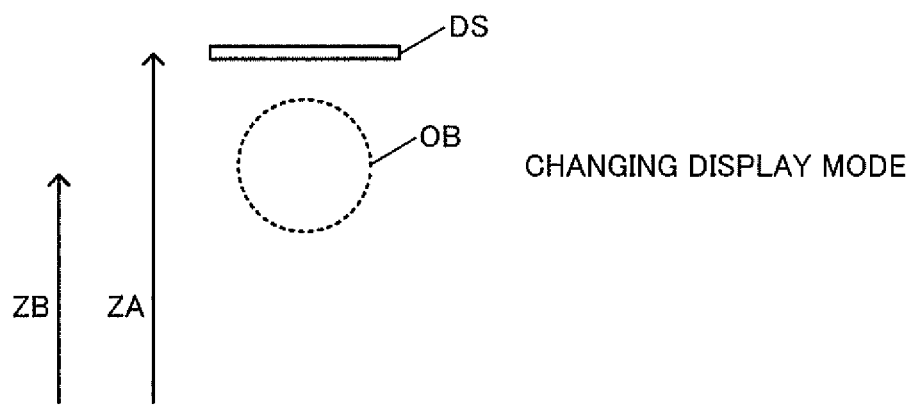

Referring to FIG. 16A and FIG. 16B, the positional relationship between the information display object DS and the object OB is determined by using a depth value ZA (Z value) of the information display object DS and a depth value ZB of the object OB. For example, referring to FIG. 16A, ZA<ZB and it is determined that the information display object DS and the object OB are in a positional relationship in which the information display object DS is closer to the front side of the user than the object OB as seen from the point-of-view of the user. Accordingly, the display mode of the information display object DS is changed. For example, the information display object DS is erased or semi-transparentized to prevent a situation in which the object OB becomes invisible behind the information display object DS. On the other hand, referring to FIG. 16B, ZA>ZB and it is determined that the information display object DS and the object OB are in a positional relationship in which the object OB is closer to the front side of the user than the information display object DS as seen from the point-of-view of the user. Accordingly, the display mode of the object OB is changed. For example, the object OB is erased or semi-transparentized to prevent a situation in which the information display object DS becomes invisible behind the object OB.

Figure 17A:
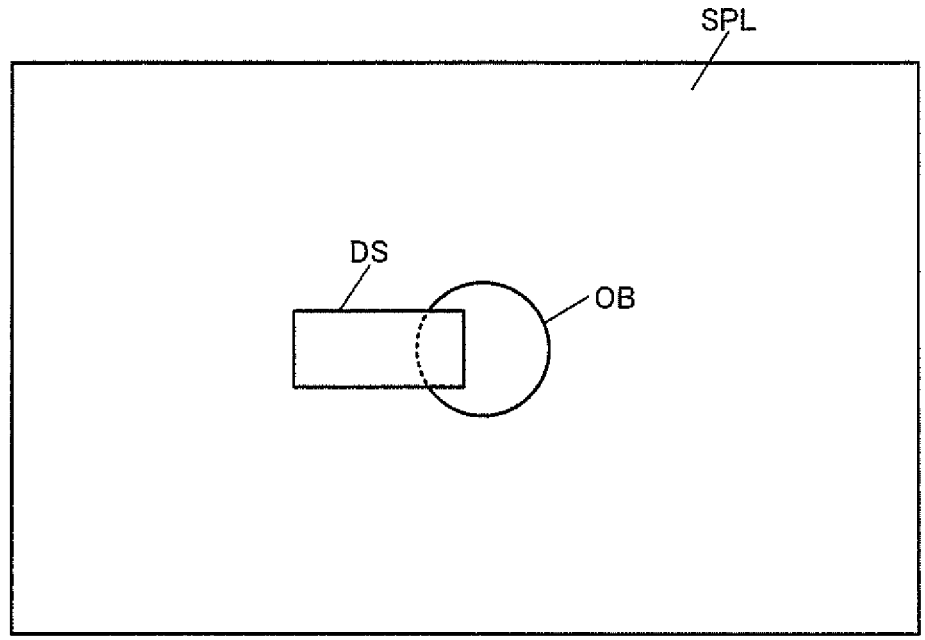
FIG. 17A and FIG. 17B are diagrams illustrating specific examples of a method for determining a positional relationship.
Figure 17B:
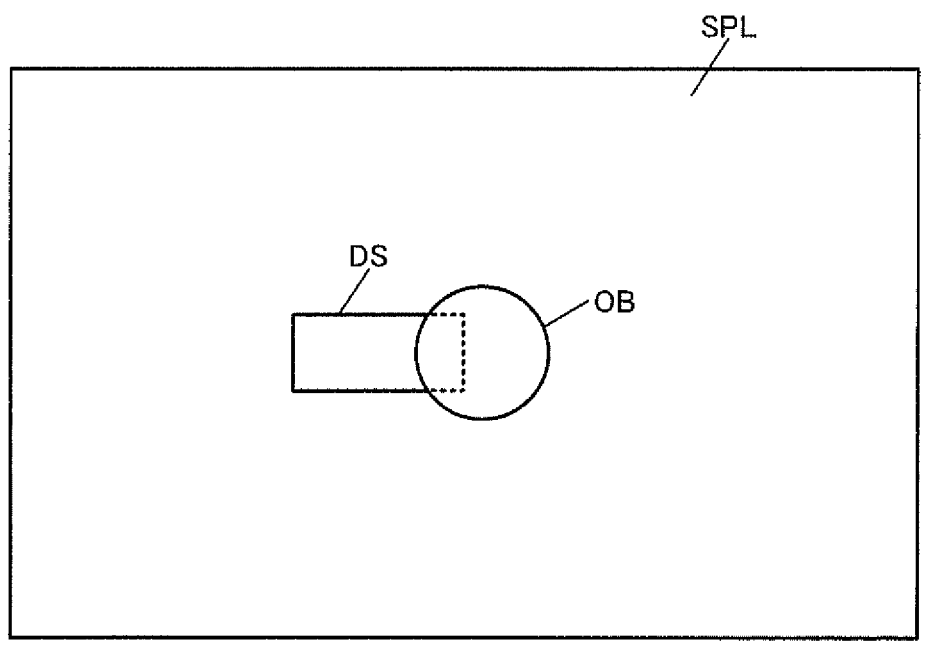

Referring to FIG. 17A and FIG. 17B, the positional relationship between the information display object DS and the object OB is determined based on the two-dimensional coordinate values when they are projected onto a plane SPL such as a projection screen (X and Y coordinate values on the plane SPL). For example, referring to FIG. 17A and FIG. 17B, it is determined that the information display object DS and the object OB overlap on the plane SPL. Referring to FIG. 17A, the information display object DS is positioned closer to the front side of the user as seen from the point-of-view, and referring to FIG. 17B, the object OB is positioned closer to the front side of the user as seen from the point-of-view. This positional relationship is determined and the display mode of either the information display object DS or the object OB is changed. For example, referring to FIG. 17A, the information display object DS is erased or semi-transparentized to prevent a situation in which the image of the object OB becomes partially lost behind the information display object DS. On the other hand, referring to FIG. 17B, the object OB is erased or semi-transparentized to prevent a situation in which the image of the information display object DS is partially lost behind the object OB.

By making the determination on positional relationship as described above and performing the change process of the display mode of the information display object or the object, it is possible to implement the appropriate change process of the display mode in consideration of the positional relationship between them and display a more appropriate display image on the HMD.

3.4 Command Process

Next detailed descriptions of the command process in the present embodiment described above with reference to FIG. 6 will be provided. In conventional communication games using characters and the like, two-dimensional games are mainstream and no consideration is given to the positional relationship and the line-of-sight relationship between the user and the character. Therefore, when the user uses the command CM3 'speak_ illustrated in FIG. 6, for example, the effect activated by the command CM3 is the same regardless whether the distance between the user and the character is short or long. Therefore, the user cannot feel a sense of distance to the character, which causes a problem that it is not possible to improve the virtual reality for the user.

Accordingly, in the present embodiment, the effects of commands are changed depending on the positional relationship, the line-of-sight relationship and the gaze situation between the user and the character. In the present embodiment, for example, the effects of commands are activated according to the information on the character as a target of gameplay by the user and the point-of-view information of the user. For example, the degrees of effects of commands and the contents of the effects are changed according to the information of the character and the point-of-view information of the user. Specifically, the effects of commands are activated according to the information of the character such as position information, direction information, game parameter information, body part information, posture information, or type information of the character, and the point-of-view information such as point-of-view position information, line-of-sight direction information of the user, or virtual camera attribute information.

FIG. 18A to FIG. 19B are diagrams describing methods for activating the effects of commands according to the positional relationship information between the user PL and the character CH.

Figure 18A:
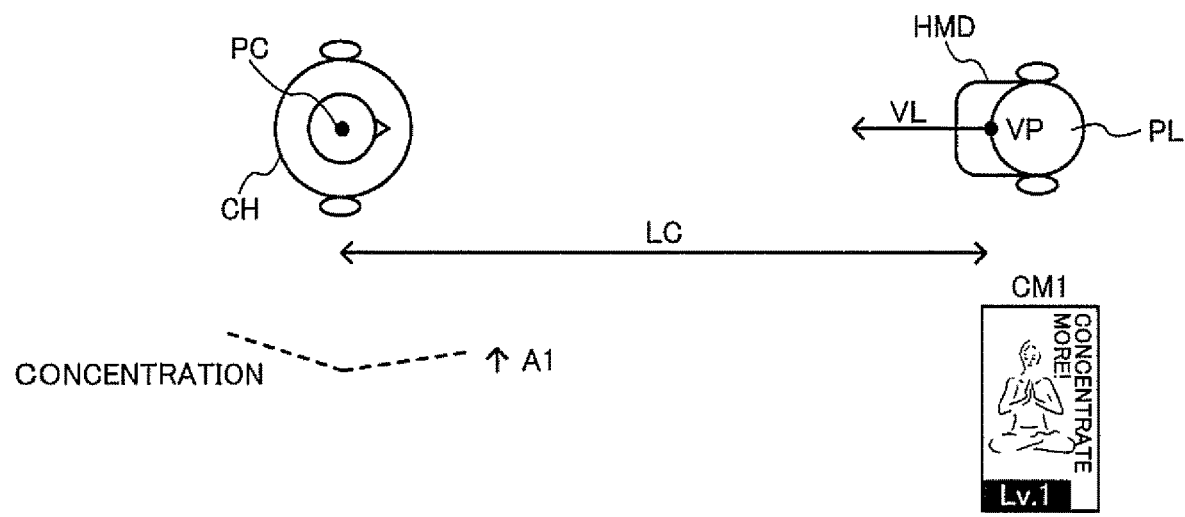
FIG. 18A and FIG. 18B are diagrams describing an activation process of an effect of a command according to positional relationship information between the user and the character.
Figure 18B:
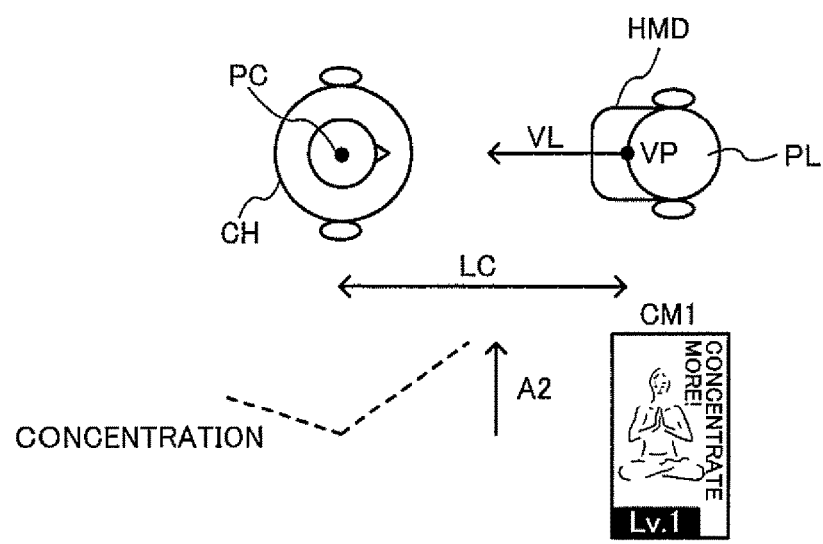

For example, referring to FIG. 18A and FIG. 18B, the degree of the effect of a command is changed according to the positional relationship information between the user PL and the character CH. In this case, the positional relationship information indicates a distance LC between the user PL and the character CH, and the distance LC is determined based on a point-of-view VP as the point-of-view information of the user PL and a position PC as information of the character CH. The positional relationship information may be information indicating the relationship between the direction of the user PL and the direction of the character CH.

Referring to FIG. 18A and FIG. 18B, the user selects and uses the command CM1 'concentrate more!_, but the distance LC between the user PL and the character CH is long in FIG. 18A. On the other hand, the distance LC is short in FIG. 18B.

In this case, in the present embodiment, even when the user uses the same command CM1 as illustrated in FIG. 18A and FIG. 18B, the degree of the effect activated by the command CM1 is changed according to the distance LC. For example, the distance LC is long in FIG. 18A and the degree of the effect of the command CM1 becomes lower accordingly, and the distance LC is short in FIG. 18B and the degree of the effect of the command CM1 becomes higher.

Specifically, when the command CM1 'concentrate more!_ is used, the distance LC is long in FIG. 18A and the degree of increasing the game parameter for the concentration of the character CH is low as indicated with A1. In contrast to this, the distance LC is short in FIG. 18B and the degree of increasing the game parameter for the concentration of the character CH is higher as indicated with A2.

Accordingly, in the case of using the command CM1 'concentrate more!_, the user can approach the character CH and use the command CM1 to further enhance the concentration of the character CH. Therefore, it is possible to allow the user to feel as if he or she got closer to the character CH and said 'concentrate more!_, thereby improving the virtual reality for the user.

Figure 19A:
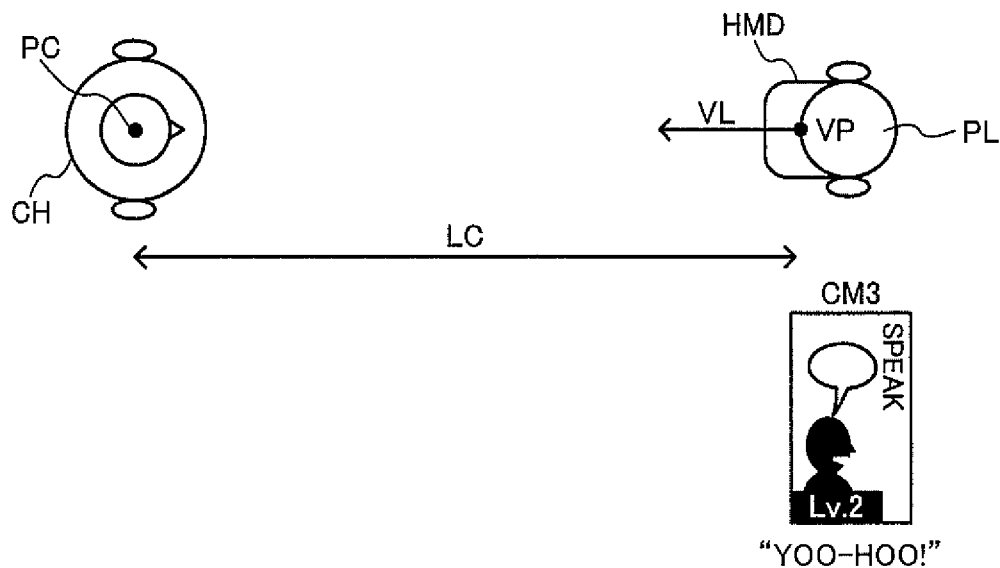
FIG. 19A and FIG. 19B are diagrams describing an activation process of an effect of a command according to positional relationship information between the user and the character.
Figure 19B:
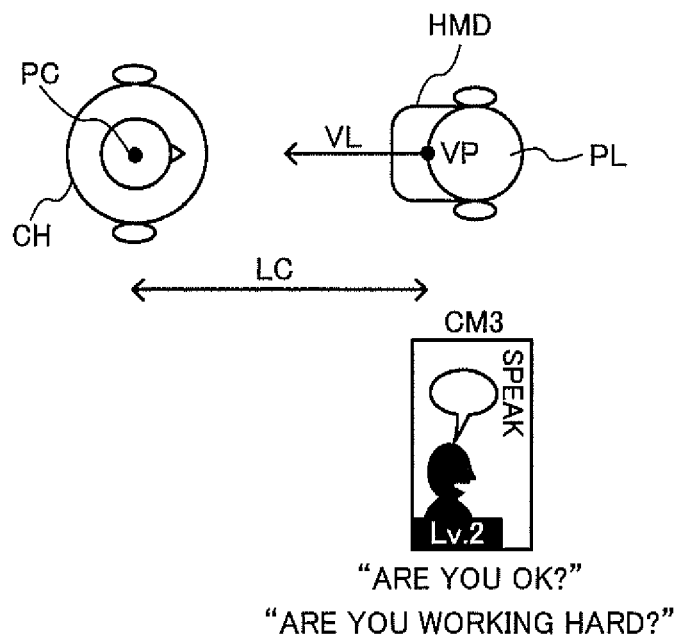

Referring to FIG. 19A and FIG. 19B, the content of the effect of a command is changed according to the positional relationship information between the user PL and the character CH. That is, the degree of the effect is changed in the example of FIG. 18A and FIG. 18B, whereas the content of the effect is changed in the example of FIG. 19A and FIG. 19B.

For example, referring to FIG. 19A, the user uses the command CM3 'speak_ when the distance LC to the character CH is long. In this case, as an utterance of the user to 'speak_, for example, the word 'Yoo-hoo!_ is output by sound or displayed in a telop (balloon) on the game screen.

On the other hand, referring to FIG. 19B, the user uses the command CM3 'speak_ when the distance LC to the character CH is short. In this case, as an utterance of the user to 'speak_, for example, the words 'Are you OK?_ or 'Are you working hard?_ is output by sound or is displayed in a telop on the game screen.

That is, in the case of FIG. 19A, the content of the effect of the command CM3 'speak_ is the output of the word 'Yoo-hoo!_ by sound (displayed in a telop). On the other hand, in the example of FIG. 19B, with a decrease in the distance LC, the content of the effect is changed to the output of the words 'Are you OK?_ and 'Are you working hard?_ by sound.

According to this, even with the same command CM3 'speak_, the content of the effect of the command is changed according to the positional relationship between the user PL and the character CH. Therefore, it is possible to improve the virtual reality for the user and the degree of variety of game representations.

Figure 20A:
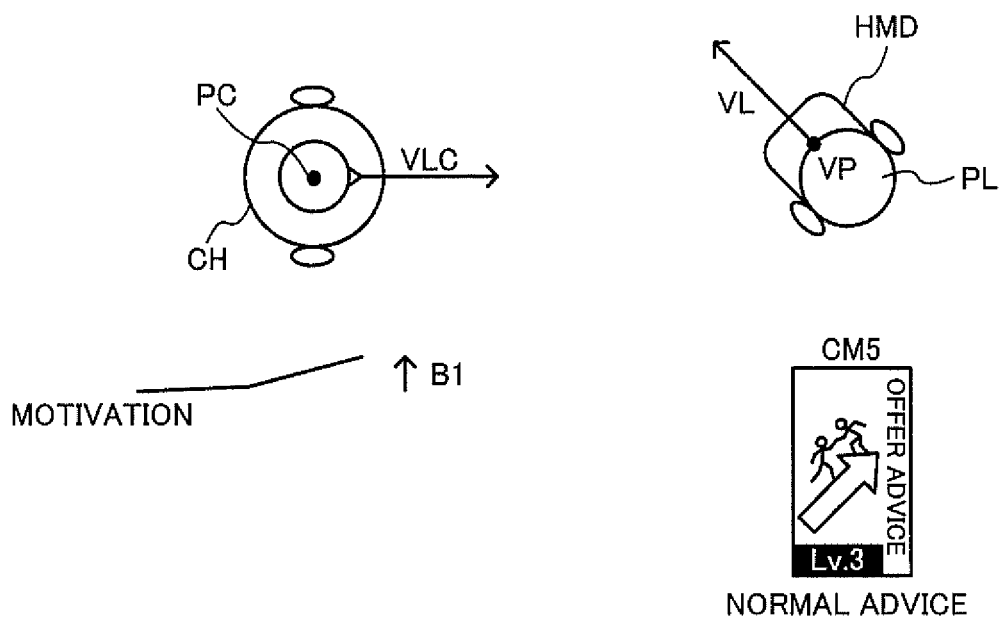
FIG. 20A and FIG. 20B are diagrams describing an activation process of an effect of a command according to line-of-sight relationship information between the user and the character.
Figure 20B:
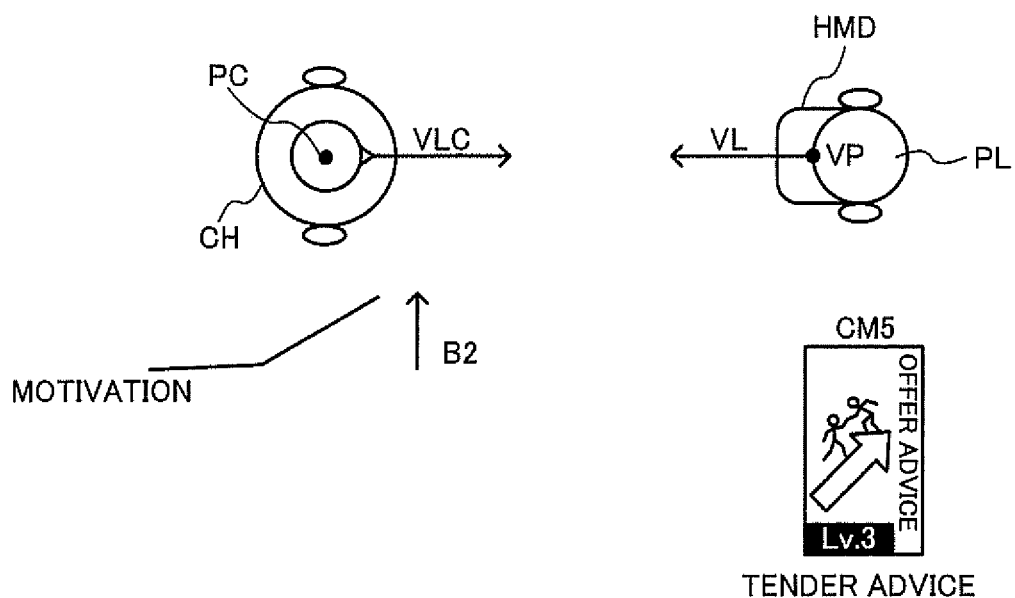

FIG. 20A and FIG. 20B are diagrams describing a method for activating the effect of a command according to line-of-sight relationship information between the user PL and the character CH.

For example, referring to FIG. 20A and FIG. 20B, the degree and content of the effect of a command are changed according to the line-of-sight relationship information between the user PL and the character CH. Referring to FIG. 20A and FIG. 20B, the line-of-sight relationship information is information representing the relationship among the line-of-sight direction VL of the user PL, the position PC and the line-of-sight direction VLC of the character CH.

In addition, referring to FIG. 20A and FIG. 20B, the user selects and uses the command CM5 'offer advice_, but the line-of-sight direction VL of the user PL is not oriented to the position PC of the character CH in FIG. 20A. In contrast to this, in FIG. 20B, the line-of-sight direction VL of the user PL is oriented to the position PC of the character CH. In addition, in FIG. 20A, the line-of-sight direction VL of the user PL is not aligned with the line-of-sight direction VLC of the character CH. In contrast to this in FIG. 20B, the line-of-sight directions VL and VLC are aligned with each other.

In this case, in the present embodiment, even when the user uses the same command CM5, the degree and content of the effect activated by the command CM2 are changed according to the line-of-sight relationship information as illustrated in FIG. 20A and FIG. 20B.

For example, in the case of the line-of-sight relationship illustrated in FIG. 20A, as the content of the effect activated by the command CM5 'offer advance_, 'normal advice_ is offered. For example, ordinary advice is offered in a normal tone. As the effect of 'normal advice_ by the command CM5, the motivation as a game parameter of the character CH increases but the degree of the increase is low as indicated with B1 in FIG. 20A.

On the other hand, in the case of the line-of-sight relationship illustrated in FIG. 20B, as the content of the effect of the command CM5 'offer advice_, 'tender advice_ is offered. For example, encouraging advice is offered in a tender tone. As the effect of 'tender advice_ by the command CM5, the motivation of the character CH increases and the degree of the increase is high as indicated with B2 in FIG. 20B.

Accordingly, by using the command CM5 'offer advice_ while properly looking at the character CH as illustrated in FIG. 20B, the user can offer better advice and increase the degree of the increase of the motivation as the effect of the advice, as compared to the case in which the user uses the command CM5 without looking at the character CH as illustrated in FIG. 20A. Therefore, it is possible to allow the user to feel as if he or she offers advice to the opposite-sex person in front of him or her, thereby significantly improving the virtual reality for the user.

Figure 21:
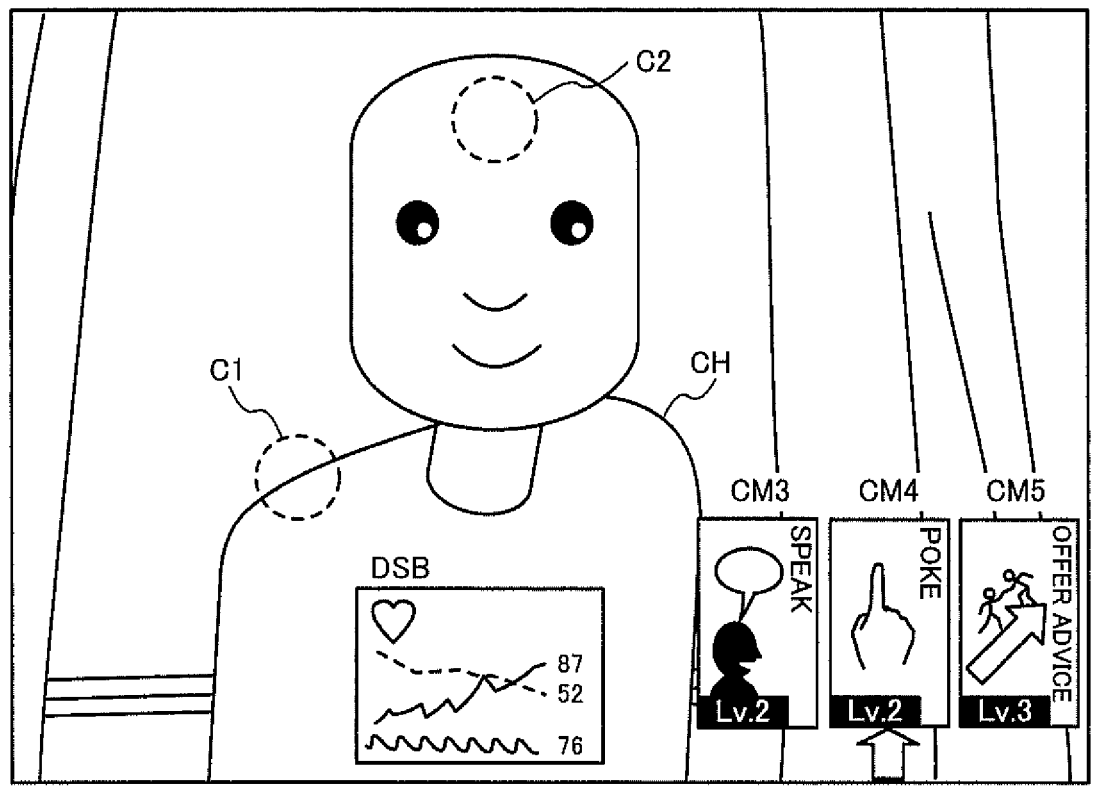
FIG. 21 is a diagram describing an activation process of an effect of a command according to gaze information of the user.

FIG. 21 is a diagram describing a method for activating the effect of a command according to gaze information of the user. For example, referring to FIG. 21, the effect of the command is activated according to gaze part information as information on the body part of the character CH gazed at by the user.

Specifically, referring to FIG. 21, the user uses a command CM4 'poke_. In this case, as indicated with C1 in FIG. 21, the user uses the command CM4 'poke_ while gazing at the shoulder of the character CH as a body part. In this case, an image (video image) representing a scene in which the user pokes the shoulder of the character CH is displayed. For example, an image representing that the user's hand (object) appears on the screen and the hand pokes the shoulder of the character CH is displayed. On the other hand, as indicated with C2 in FIG. 21, the user uses the command CH4 'poke_ while gazing at the head (forehead) of the character CH as a body part. In this case, an image representing a scene in which the user pokes the head of the character CH is displayed. For example, an image representing that the user's hand appears on the screen and the hand pokes the head of the character CH is displayed.

Accordingly, even when the same command CM4 'poke_ is used, the action 'poke_ is performed in different ways according to the body part of the character CH gazed at by the user. In addition, the user's action is performed on the body part gazed at by the user, which allows the user to feel as if he or she actually pokes the character CH, thereby improving the virtual reality for the user.

According to the methods for the command process in the present embodiment as described above, the virtual reality for the user can be further improved. On the other hand, according to the methods for the command process in the present embodiment, a large number of information display objects are arranged and displayed as illustrated in FIG. 6 and FIG. 21. Accordingly, there is likely to occur a problem of a collision between the information display object and another object in the virtual space. In this respect, in the present embodiment, even when the information display object and the object have entered into a positional relationship of collision or the like, the display mode of the information display object or the object can be changed to display a more appropriate display image on the HMD.

3.5 Process Example

Figure 22:
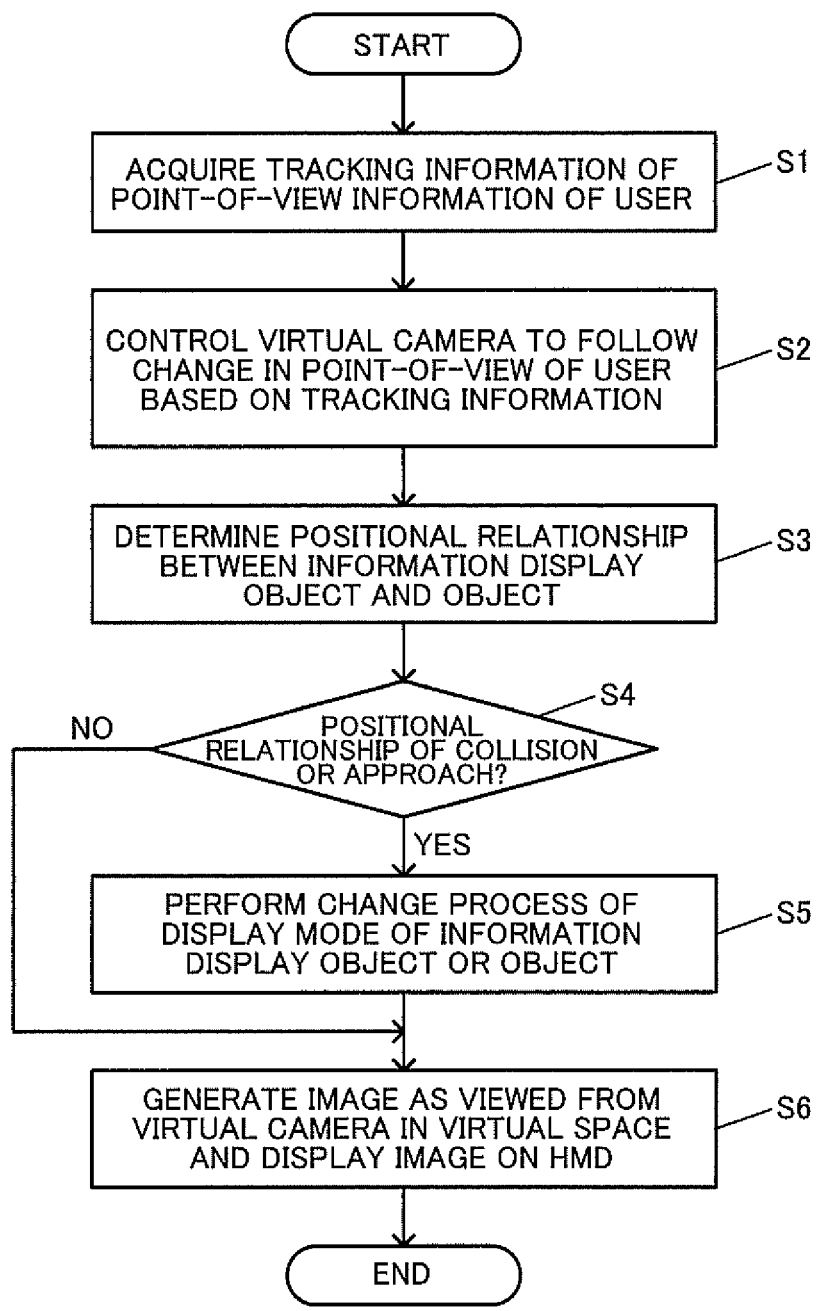
FIG. 22 is a flowchart illustrating a detailed process example according to the present embodiment.

Next, an example of the process according to the present embodiment is described with reference to a flowchart in FIG. 22. First, tracking information of the point-of-view information of the user is acquired (step S1). For example, the tracking information obtained through the tracking process described with reference to FIG. 2A to FIG. 3B is acquired. Then, based on the acquired tracking information, the virtual camera is controlled to follow a change in the point-of-view of the user (step S2). For example, the virtual camera is controlled such that, when the user turns the line-of-sight upward, downward, leftward, or rightward in the real world, the line-of-sight direction of the virtual camera also turns upward, downward, leftward, or rightward accordingly in the virtual space. In addition, the virtual camera is controlled such that, when the point-of-view position of the user moves upward, downward, leftward, or rightward in the real world, the point-of-view position of the virtual camera also moves upward, downward, leftward, or rightward accordingly in the virtual space.

Next, the positional relationship between the information display object and the object is determined (step S3). For example, the positional relationship between them is determined by the method described above with reference to FIG. 15A to FIG. 17B. Then, it is determined whether the information display object and the object have entered into a positional relationship of collision or approach (step S4). When they have entered into a positional relationship of collision or approach, the change process of the display mode of the information display object or the object is performed (step S5). For example, the change process of the display mode described above with reference to FIG. 13A to FIG. 14C is performed. Then, an image as viewed from the virtual camera in the virtual space is generated and displayed on the HMD (step S6). For example, as images as viewed from the virtual camera, a left-eye image and a right-eye image for stereoscopic viewing are generated and displayed on the HMD.

Although the present embodiments have been described in detail above, those skilled in the art will readily appreciate that marry modifications are possible in the embodiment without materially departing from the novel teachings and advantages of the present disclosure. Accordingly, all such modifications are intended to be included within the scope of the present disclosure. For example, each of terms (such as a change in the line-of-sight direction, a character, or a book) that is at least once used together with another broader-sense or synonymous term (such as a change in point-of-view, a moving body, or an item) in the specification or the drawings can be replaced with the other term at any part of the specification or the drawings. In addition, the setting process of a virtual space, the control process of a virtual camera, the arrangement process of an information display object, the change process of a display mode, and the determination process of a positional relationship are not limited to those described above in relation to the present embodiments, and methods, processes, and configurations equivalent to them are included in the range of the present disclosure. The embodiments can be applied to various games. The embodiments can be applied to various simulation systems such as an arcade game apparatus, a consumer game apparatus, a large attraction system where a large number of users play the game, and the like.

What is claimed is:

1. A simulation system comprising a processor including hardware,
the processor being configured to perform:
a virtual space setting process of setting a virtual space in which a plurality of objects are arranged;
a virtual camera control process of controlling a virtual camera corresponding to a point-of-view of a user wearing a head mounted display; and
a display process of generating an image as viewed from the virtual camera in the virtual space as a display image on the head mounted display,
in the virtual space setting process,
the processor performs
arranging at least one information display object controlled to follow a change in the point-of-view of the user in the virtual space, and
in the display process,
the processor performs
when the information display object and an object in the virtual space have entered into a given positional relationship, performing a change process of a display mode of the information display object or the object, and changing the display mode of the object among the information display object and the object when the information display object is of a first type, and changing the display mode of the information display object among the information display object and the object when the information display object is of a second type.

2. The simulation system as defined in claim 1, wherein
in the display process,
the processor performs
the change process of the display mode according to priority or importance level of the information display object.

3. The simulation system as defined in claim 2, wherein
in the display process,
the processor performs
the change process of the display mode using the priority or the importance level associated with the information display object.

4. The simulation system as defined in claim 1, wherein
in the display process,
the processor performs
the change process of the display mode according to length of a time elapsed from the display of the information display object.

5. The simulation system as defined in claim 1, wherein as the change process of the display mode, the processor performs an erase process of the information display object or the object, a semi-transparentization process of the information display object or the object, a cancel process of following by the information display object to a line-of-sight direction of the user, a movement process of the information display object or the object, a size change process of the information display object or the object, or a color information change process of the information display object or the object.

6. The simulation system as defined in claim 1, the information display object being a display object for description display, a display object for status display, a display object for conversation display, a display object for command selection, or a display object for menu display.

7. The simulation system as defined in claim 1, the object being an object of a moving body, a fixed body, an item, or a background appearing in a game.

8. The simulation system as defined in claim 1, wherein the processor performs a determination process of determining a positional relationship between the information display object and the object, and in the display process, the processor performs the change process of the display mode when it is determined by the determination process that the information display object and the object have entered into the given positional relationship.

9. The simulation system as defined in claim 8, wherein in the display process, the processor performs the change process of the display mode when it is determined by the determination process that the information display object and the object have entered into a positional relationship of collision or a positional relationship of approach.

10. The simulation system as defined in claim 8, wherein in the determination process, the processor performs determining the positional relationship based on three-dimensional coordinate values of the information display object and the object, depth values of the information display object and the object, or two-dimensional coordinate values of the information display object and the object that are projected onto a plane.

11. The simulation system as defined in claim 1, wherein in the virtual space setting process, the processor performs arranging the information display object at a given depth position as seen in the line-of-sight direction of the user in such a manner as to follow a change in the point-of-view of the user.

12. The simulation system as defined in claim 1, wherein in the virtual camera control process, the processor performs control ling the virtual camera to follow a change in the point-of-view of the user based on tracking information of point-of-view information of the user.

13. The simulation system as defined in claim 1, wherein the processor performs a game process, and in the game process, the processor performs a process of activating an effect of a command according to information of a character as a target of gameplay by the user and the point-of-view information of the user.

14. A processing method comprising:

a virtual space setting process of setting a virtual space in which a plurality of objects are arranged;

a virtual camera control process of controlling a virtual camera corresponding to a point-of-view of a user wearing a head mounted display; and a display process of generating an image as viewed from the virtual camera in the virtual space as a display image on the head mounted display, wherein in the virtual space setting process, arranging at least one information display object controlled to follow a change in the point-of-view of the user in the virtual space, and in the display process, when the information display object and an object in the virtual space have entered into a given positional relationship, performing a change process of a display mode of the information display object or the object, and changing the display mode of the object among the information display object and the object when the information display object is of a first type, and changing the display mode of the information display object among the information display object and the object when the information display object is of a second type.

15. A computer-readable information storage medium storing a program for causing a computer to perform the processing method as defined in claim 14.

* * * * *